US006288730B1

(12) United States Patent
Duluk, Jr. et al.

(10) Patent No.: US 6,288,730 B1
(45) Date of Patent: Sep. 11, 2001

(54) METHOD AND APPARATUS FOR GENERATING TEXTURE

(75) Inventors: Jerome F. Duluk, Jr., Palo Alto; Richard E. Hessel, Pleasanton; Joseph P. Grass, Menlo Park; Abbas Rashid, Fremont; Bo Hong, San Jose; Abraham Mammen, Pleasanton, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/378,408

(22) Filed: Aug. 20, 1999

Related U.S. Application Data
(60) Provisional application No. 60/097,336, filed on Aug. 20, 1998.

(51) Int. Cl.[7] .................................................. G06T 11/40
(52) U.S. Cl. ........................ 345/552; 345/568; 345/428; 345/582; 345/587
(58) Field of Search .................................. 345/430, 501, 345/506, 502, 503, 507–509, 513, 523, 521, 428, 568, 530, 566, 552, 536–538, 531, 557, 556

(56) References Cited

U.S. PATENT DOCUMENTS

| Re. 36,145 | 3/1999 | DeAguiar et al. | 345/511 |
|---|---|---|---|
| 4,945,500 | 7/1990 | Deering | 364/522 |
| 4,970,636 | 11/1990 | Snodgrass et al. | 364/518 |
| 5,083,287 | 1/1992 | Obata et al. | 395/126 |
| 5,402,532 | 3/1995 | Epstein et al. | 395/122 |
| 5,574,836 | 11/1996 | Broemmelsiek | 345/427 |
| 5,684,939 | 11/1997 | Foran et al. | 395/131 |
| 5,710,876 | 1/1998 | Peercy et al. | 395/126 |
| 5,767,859 | 6/1998 | Rossin et al. | 345/434 |
| 5,828,378 | 10/1998 | Shiraishi | 345/422 |
| 5,854,631 | 12/1998 | Akeley et al. | 345/419 |
| 5,864,342 | 1/1999 | Kajiya et al. | 345/418 |
| 5,880,736 | 3/1999 | Peercy et al. | 345/426 |
| 5,920,326 | 7/1999 | Rentschler et al. | 345/503 |
| 5,949,424 | 9/1999 | Cabral et al. | 345/426 |
| 5,977,977 | 11/1999 | Kajiya et al. | 345/418 |
| 5,990,904 | * 11/1999 | Griffin | 345/435 |
| 6,002,410 | * 12/1999 | Battle | 345/513 |
| 6,167,486 | * 12/2000 | Lee et al. | 711/120 |

OTHER PUBLICATIONS

Watt, "3D Computer Graphics" (2nd ed.), Chapter 4, Reflection and Illumination Models, p. 89–126.
Foley et al., Computer Graphics—Principles and Practice (2nd ed. 1996), Chapter 16, Illumination and Shading, pp. 721–814.
Lathrop, "The Way Computer Graphics Works" (1997) Chapter 7, Rendering (Converting A Scene to Pixels), pp. 93–150.
Peercy et al., "Efficient Bump Mapping Hardware" (Computer Graphics Proceedings, Annual Conference Series, 1997) pp. 303–306.
Schilling et al. "Texram: A smart memory for texturing", IEEE Computer Graphics and Applications, 5/96, pp. 32–41.*

* cited by examiner

Primary Examiner—Kee M. Tung
(74) Attorney, Agent, or Firm—Flehr Hohbach Test Albritton & Herbert LLP

(57) ABSTRACT

A deferred graphics pipeline processor comprising a texture unit and a texture memory associated with the texture unit. The texture unit applies texture maps stored in the texture memory, to pixel fragments. The textures are MIP-mapped and comprise a series of texture maps at different levels of detail, each map representing the appearance of the texture at a given distance from an eye point. The texture unit performs tri-linear interpolation from the texture maps to produce a texture value for a given pixel fragment that approximates the correct level of detail. The texture memory has texture data stored and accessed in a manner which reduces memory access conflicts and thus improves throughput of said texture unit.

39 Claims, 12 Drawing Sheets

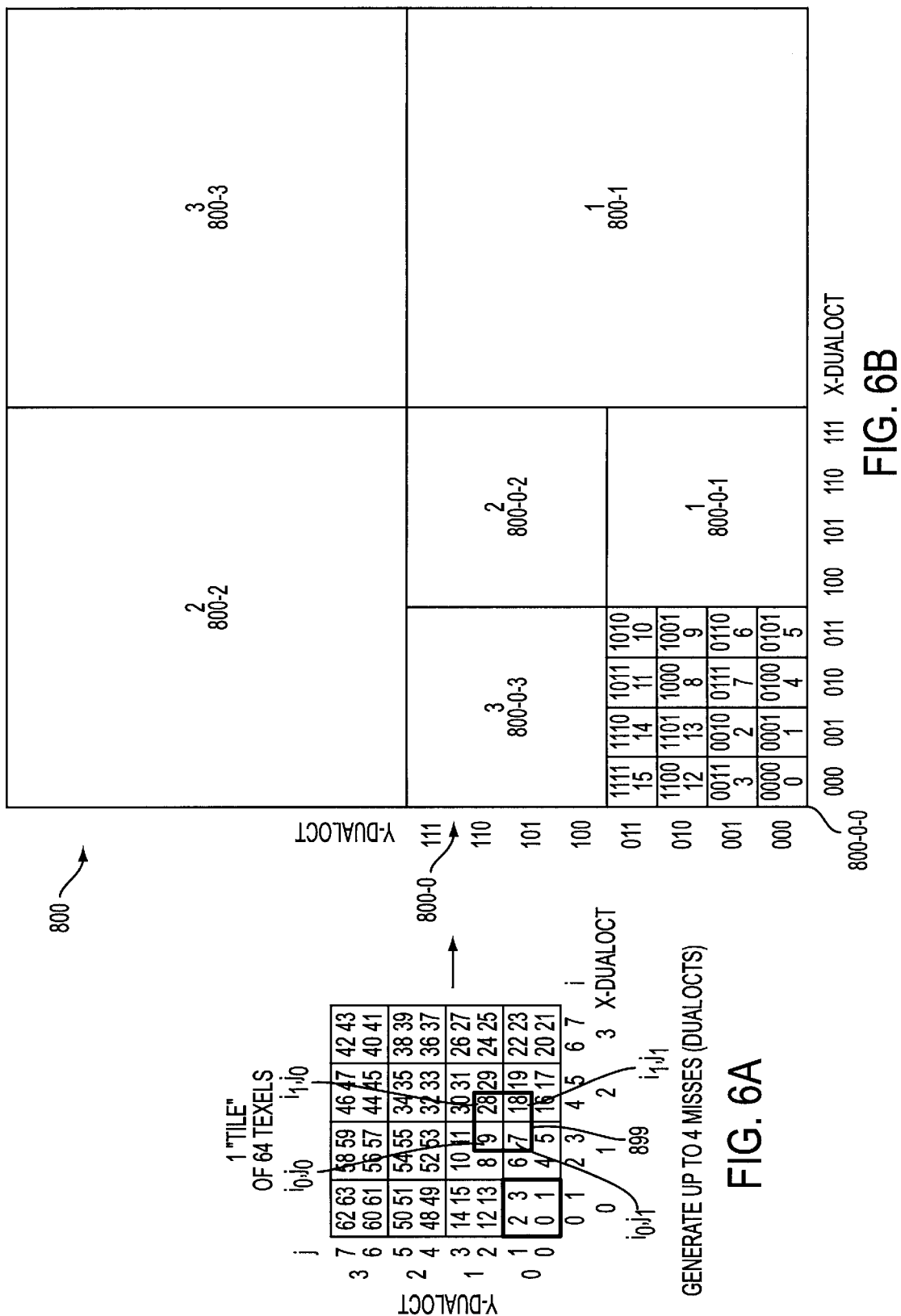

METHOD AND APPARATUS FOR GENERATING TEXTURE

RELATED APPLICATIONS

This application claims the benefit of U.S. Provisional Application Ser. No. 60/097,336 entitled Graphics Processor with Deferred Shading filed Aug. 20, 1998 is hereby incorporated by reference.

This application is also related to the following U.S. patent applications, each of which are incorporated herein by reference:

Ser. No. 09/213,990, filed Dec. 17, 1998, entitled HOW TO DO TANGENT SPACE LIGHTING IN A DEFERRED SHADING ARCHITECTURE;

Ser. No. 09/378,598, filed Aug. 20, 1999, entitled APPARATUS AND METHOD FOR PERFORMING SETUP OPERATIONS IN A 3-D GRAPHICS PIPELINE USING UNIFIED PRIMITIVE DESCRIPTORS;

Ser. No. 09/378,633, filed Aug. 20, 1999 entitled SYSTEM, APPARATUS AND METHOD FOR SPATIALLY SORTING IMAGE DATA IN A THREE-DIMENSIONAL GRAPHICS PIPELINE;

Ser. No. 09/378,439 filed Aug. 20, 1999, entitled GRAPHICS PROCESSOR WITH PIPELINE STATE STORAGE AND RETRIEVAL;

Ser. No. 09/378,408, filed Aug. 20, 1999, entitled METHOD AND APPARATUS FOR GENERATING TEXTURE;

Ser. No. 09/379,144, filed Aug. 20, 1999 entitled APPARATUS AND METHOD FOR GEOMETRY OPERATIONS IN A 3D GRAPHICS PIPELINE;

Ser. No. 09/372,137, filed Aug. 20,1999 entitled APPARATUS AND METHOD FOR FRAGMENT OPERATIONS IN A 3D GRAPHICS PIPELINE; and Ser. No. 09/378,637, filed Aug. 20, 1999, entitled DEFERRED SHADING GRAPHICS PIPELINE PROCESSOR.

FIELD

This invention relates to computing systems generally, to three-dimensional computer graphics, more particularly to structure and method for generating texture in a three-dimensional graphics processor implementing deferred shading and other enhanced features.

BACKGROUND

Three-dimensional Computer Graphics

Computer graphics is the art and science of generating pictures with a computer. Generation of pictures, or images, is commonly called rendering. Generally, in three-dimensional (3D) computer graphics, geometry that represents surfaces (or volumes) of objects in a scene is translated into pixels stored in a frame buffer, and then displayed on a display device. Real-time display devices, such as CRTs or LCDs used as computer monitors, refresh the display by continuously displaying the image over and over. This refresh usually occurs row-by-row, where each row is called a raster line or scan line. In this document, raster lines are numbered from bottom to top, but are displayed in order from top to bottom.

In a 3D animation, a sequence of images is displayed, giving the appearance of motion in three-dimensional space. Interactive 3D computer graphics allows a user to change his viewpoint or change the geometry in real-time, thereby requiring the rendering system to create new images on-the-fly in real-time. Therefore, real-time performance in color, with high quality imagery, is very important.

In 3D computer graphics, each renderable object generally has its own local object coordinate system, and therefore needs to be translated (or transformed) from object coordinates to pixel display coordinates. Conceptually, this is a 4-step process: 1) translation from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. Screen coordinates are points in three-dimensional space, and can be in either screen-precision (i.e., pixels) or object-precision (high precision numbers, usually floating-point), as described later. These translation steps can be compressed into one or two steps by precomputing appropriate translation matrices before any translation occurs. Once the geometry is in screen coordinates, it is broken into a set of pixel color values (that is "rasterized") that are stored into the frame buffer. Many techniques are used for generating pixel color values, including Gouraud shading, Phong shading, and texture mapping.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference).

FIG. 1 shows a three-dimensional object 100, a tetrahedron, with its own coordinate axes ($x_{obj}$, $y_{obj}$, $z_{obj}$). The three-dimensional object is translated, scaled, and placed in the viewing point's coordinate system based on ($x_{eye}$, $y_{eye}$, $z_{eye}$). The object is projected onto the viewing plane, thereby correcting for perspective. At this point, the object appears to have become two-dimensional; however, in accordance with the present invention, the object's z-coordinates are preserved so they can be used later by hidden surface removal techniques. The object is finally translated to screen coordinates, based on ($x_{screen}$, $y_{screen}$, $z_{screen}$), where $z_{screen}$ is going perpendicularly into the page. Points on the object now have their x and y coordinates described by pixel location (and fractions thereof) within the display screen and their z coordinates in a scaled version of distance from the viewing point.

Because many different portions of geometry can affect the same pixel, the geometry representing the surfaces closest to the scene viewing point must be determined. Thus, in accordance with the present invention for each pixel, the visible surfaces within the volume subtended by the pixel's area determine the pixel color value, while hidden surfaces are prevented from affecting the pixel. Non-opaque surfaces closer to the viewing point than the closest opaque surface (or surfaces, if an edge of geometry crosses the pixel area) affect the pixel color value, while all other non-opaque surfaces are discarded. In this document, the term "occluded" is used to describe geometry which is hidden by other non-opaque geometry.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company, Reading, Mass., 1990, reprinted with corrections 1991, ISBN0-201-12110-7 (hereinafter referred to as the Foley Reference). In the Foley Reference, on page 650, the terms "image-precision" and "object-precision" are defined: "Image-precision algorithms are typically performed at the resolution of the display device, and determine the visibility at each pixel. Object-precision algorithms are performed at the precision with which each object is defined, and determine the visibility of each object."

As a rendering process proceeds, most prior art renderers must compute the color value of a given screen pixel multiple times because multiple surfaces intersect the volume subtended by the pixel. The average number of times a pixel needs to be rendered, for a particular scene, is called the depth complexity of the scene. Simple scenes have a depth complexity near unity, while complex scenes can have a depth complexity perhaps within the range of ten to twenty, complexity of ten, 90% of the computation is wasted on hidden pixels. This wasted computation is typical of hardware renderers that use the simple Z-buffer technique (discussed later herein), generally chosen because it is easily built in hardware. Methods more complicated than the Z Buffer technique have heretofore generally been too complex to build in a cost-effective manner. An important feature of the method and apparatus invention presented here is the avoidance of this wasted computation by eliminating hidden portions of geometry before they are rasterized, while still being simple enough to build in cost-effective hardware.

When a point on a surface (frequently a polygon vertex) is translated to screen coordinates, the point has three coordinates: 1) the x-coordinate in pixel units (generally including a fraction); 2) the y-coordinate in pixel units (generally including a fraction); and 3) the z-coordinate of the point in either eye coordinates, distance from the virtual screen, or some other coordinate system which preserves the relative distance of surfaces from the viewing point. In this document, positive z-coordinate values are used for the "look direction" from the viewing point, and smaller positive values indicate a position closer to the viewing point.

When a surface is approximated by a set of planar polygons, the vertices of each polygon are translated to screen coordinates. For points in or on the polygon (other than the vertices), the screen coordinates are interpolated from the coordinates of vertices, typically by the processes of edge walking and span interpolation. Thus, a z-coordinate value is generally included in each pixel value (along with the color value) as geometry is rendered.

Polygons are used in 3D graphics to define the shape of objects. Texture mapping is a technique for simulating surface textures by coloring polygons with detailed images. Typically, a single texture map will cover an entire object that consists of many polygons. A texture map consists of one or more rectangular arrays of Red-Green-Blue-Alpha (RGBA) color, with alpha being the percentage of translucency. Texture coordinates for each vertices of a polygon are determined. These coordinates are interpolated for each geometry component, the texture values are looked up in the texture map and the color is assigned to the fragment.

Objects appear smaller when they are farther from the viewer. Therefore, texture maps must be scaled so that the texture pattern appears the same size relative to the object being textured. To avoid scaling and filtering a texture image for each fragment, a series of pre-filtered texture maps, called mipmaps are used. Each texture has a group of associated mipmaps. Each mipmap, also called a level of detail (LOD), is formed of an n×m array of Texture elements (texels), where n and m are powers of 2. Each texel comprises an R, G, B, and A component. Typically each successive LOD has a power of 2 lower resolution than the previous LOD, and thus a cascading series of smaller, prefiltered images are provided, rather than requiring such computations to be performed in real-time. For example, LOD 0 may be a 512×512 array, and LOD 9 is 1×1 array.

Exact texture coordinates and LOD are typically computed for a sample pixel. The texel values surrounding these texture coordinates are then interpolated to generate texture values for the sample. In bilinear interpolation, the prestored LOD array closest to the computed LOD value is selected, and the values of the four texels in the array nearest to the texture coordinates are interpolated to generate texture values for a sample. In trilinear interpolation, the four texels closest to the texture coordinates in the prestored LOD arrays above and below the computed LOD are used to generate the texture values for a sample. For example, if an LOD value of 3.2 is computed then texels from LOD array 3 and LOD array 4 are used for trilinear interpolation. Trilinear interpolation thus requires eight texels per sample, which makes high memory bandwidth a critical component to efficient image rendering.

BRIEF DESCRIPTION OF THE DRAWINGS

Additional objects and feature of the invention will be more readily apparent from the following detailed description and appended claims when taken in conjunction with the drawings, in which:

FIG. 4b is a block diagram depicting texture buffer tag blocks and memory queues associates with the texel prefetch buffer of FIG. 4a;

FIGS. 6a and 6b illustrate a spatially coherent texel mapping for texture memory in accordance with one embodiment of this invention;

DETAILED DESCRIPTION

Figure 1:
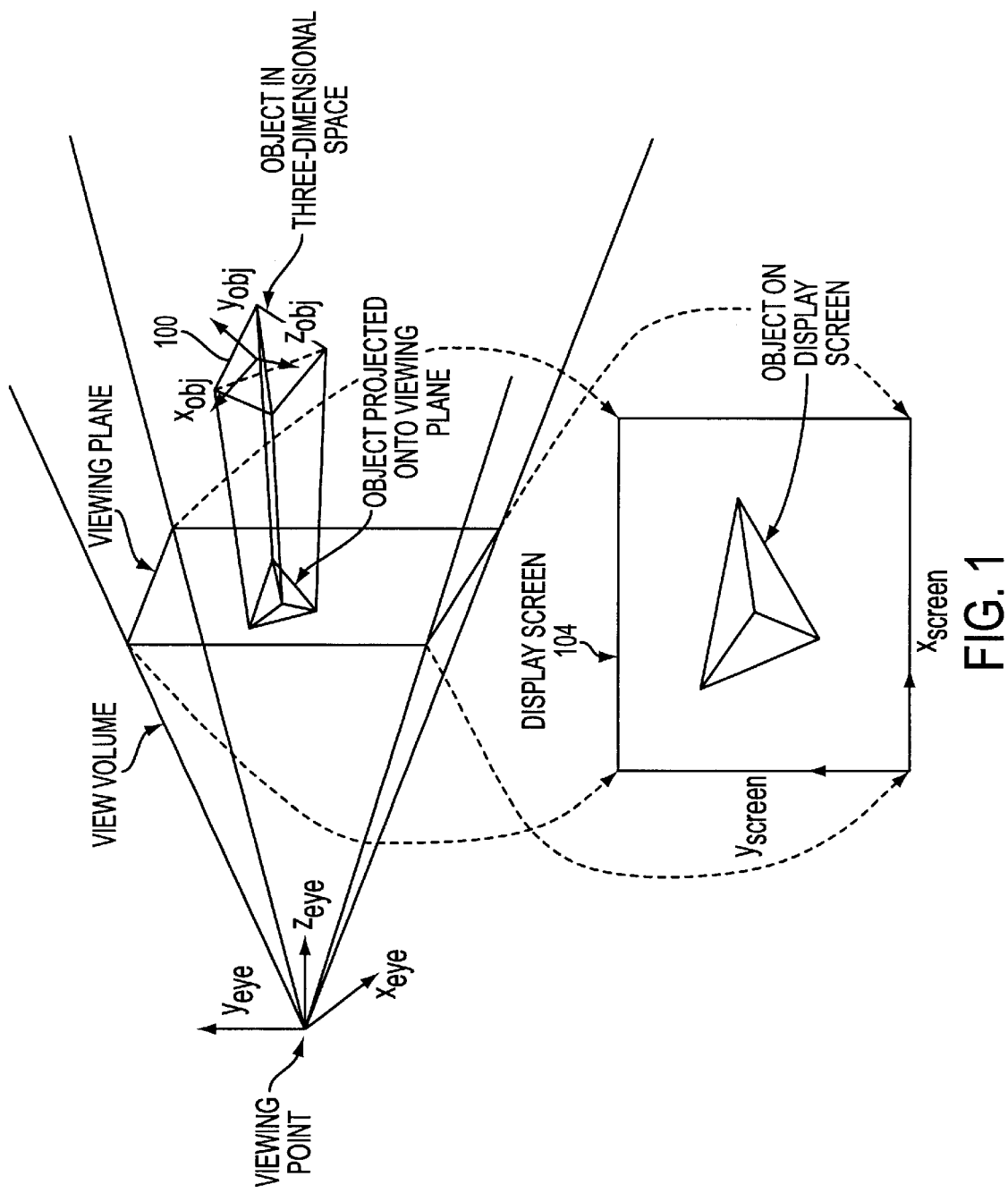
FIG. 1 depicts a three dimensional object and its image on a display screen.

The invention is directed to a new graphics processor and method and encompasses numerous substructures including specialized subsystems, subprocessors, devices, architectures, and corresponding procedures. Embodiments of the invention may include one or more of deferred shading, a tiled frame buffer, and multiple-stage hidden surface removal processing, as well as other structures and/or procedures. In this document, this graphics processor of this invention is referred to as the DSGP (for Deferred Shading Graphics Processor), and the associated pipeline is referred to as the "DSGP pipeline", or simply "the pipeline".

This present invention includes numerous embodiments of the DSGP pipeline. Embodiments of the present invention are designed to provide high-performance 3D graphics with Phong shading, subpixel anti-aliasing, and texture-and bump-mapping in hardware. The DSGP pipeline provides these sophisticated features without sacrificing performance.

The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL and Direct3D Application Program Interfaces (APIs). The OpenGL specification, entitled "The OpenGL Graphics System: A Specification (Version 1.2)" by Mark Segal and Kurt Akeley, edited by Jon Leech, is included incorporated by reference.

Several exemplary embodiments or versions of a Deferred Shading Graphics Pipeline are described here, and embodiments having various combinations of features may be implemented. Additionally, features of the invention may be implemented independently of other features, and need not be used exclusively in Graphics Pipelines which perform shading in a deferred manner.

Tiles, Stamps, Samples, and Fragments

Each frame (also called a scene or user frame) of 3D graphics primitives is rendered into a 3D window on the display screen. The pipeline renders primitives, and the invention is described relative to a set of renderable primitives that include: 1) triangles, 2) lines, and 3) points. Polygons with more than three vertices are divided into triangles in the Geometry block, but the DSGP pipeline could be easily modified to render quadrilaterals or polygons with more sides. Therefore, since the pipeline can render any polygon once it is broken up into triangles, the inventive renderer effectively renders any polygon primitive. A window consists of a rectangular grid of pixels, and the window is divided into tiles (hereinafter tiles are assumed to be 16×16 pixels, but could be any size). If tiles are not used, then the window is considered to be one tile. Each tile is further divided into stamps (hereinafter stamps are assumed to be 2×2 pixels, thereby resulting in 64 stamps per tile, but stamps could be any size within a tile). Each pixel includes one or more samples, where each sample has its own color value and z-value (hereinafter, pixels are assumed to include four samples, but any number could be used). A fragment is the collection of samples covered by a primitive within a particular pixel. The term "fragment" is also used to describe the collection of visible samples within a particular primitive and a particular pixel.

Deferred Shading

In ordinary Z-buffer rendering, the renderer calculates the color value (RGB or RGBA) and z value for each pixel of each primitive, then compares the z value of the new pixel with the current z value in the Z-buffer. If the z value comparison indicates the new pixel is "in front of" the existing pixel in the frame buffer, the new pixel overwrites the old one; otherwise, the new pixel is thrown away.

Z-buffer rendering works well and requires no elaborate hardware. However, it typically results in a great deal of wasted processing effort if the scene contains many hidden surfaces. In complex scenes, the renderer may calculate color values for ten or twenty times as many pixels as are visible in the final picture. This means the computational cost of any per-pixel operation—such as Phong shading or texture-mapping—is multiplied by ten or twenty. The number of surfaces per pixel, averaged over an entire frame, is called the depth complexity of the frame. In conventional z-buffered renderers, the depth complexity is a measure of the renderer's inefficiency when rendering a particular frame.

In accordance with the present invention, in a pipeline that performs deferred shading, hidden surface removal (HSR) is completed before any pixel coloring is done. The objective of a deferred shading pipeline is to generate pixel colors for only those primitives that appear in the final image (i.e., exact HSR). Deferred shading generally requires the primitives to be accumulated before HSR can begin. For a frame with only opaque primitives, the HSR process determines the single visible primitive at each sample within all the pixels. Once the visible primitive is determined for a sample, then the primitive's color at that sample location is determined. Additional efficiency can be achieved by determining a single per-pixel color for all the samples within the same pixel, rather than computing per-sample colors.

For a frame with at least some alpha blending (as defined in the above referenced OpenGL specification) of primitives (generally due to transparency), there are some samples that are colored by two or more primitives. This means the HSR process must determine a set of visible primitives per sample.

In some APIs, such as OpenGL, the HSR process can be complicated by other operations (that is by operation other than depth test) that can discard primitives. These other operations include: pixel ownership test, scissor test, alpha test, color test, and stencil test (as described elsewhere in this specification). Some of these operations discard a primitive based on its color (such as alpha test), which is not determined in a deferred shading pipeline until after the HSR process (this is because alpha values are often generated by the texturing process, included in pixel fragment coloring). For example, a primitive that would normally obscure a more distant primitive (generally at a greater z-value) can be discarded by alpha test, thereby causing it to not obscure the more distant primitive. A HSR process that does not take alpha test into account could mistakenly discard the more distant primitive. Hence, there may be an inconsistency between deferred shading and alpha test (similarly, with color test and stencil test); that is, pixel coloring is postponed until after HSR, but HSR can depend on pixel colors. Simple solutions to this problem include: 1) eliminating non-depth-dependent tests from the API, such as alpha test, color test, and stencil test, but this potential solution might prevent existing programs from executing properly on the deferred shading pipeline; and 2) having the HSR process do some color generation, only when needed, but this potential solution would complicate the data flow considerably.

Therefore, neither of these choices is attractive. A third alternative, called conservative hidden surface removal (CHSR), is one of the important innovations provided by the inventive structure and method. CHSR is described in great detail in subsequent sections of the specification.

Another complication in many APIs is their ability to change the depth test. The standard way of thinking about 3D rendering assumes visible objects are closer than obscured objects (i.e., at lesser z-values), and this is accomplished by selecting a "less-than" depth test (i.e., an object is visible if its z-value is "less-than" other geometry). However, most APIs support other depth tests such as: greater-than, less-than, greater-than-or-equal-to, equal, less-than-or-equal-to, less-than, not-equal, and the like algebraic, magnitude, and logical relationships. This essentially "changes the rules" for what is visible. This complication is compounded by an API allowing the application program to change the depth test within a frame. Different geometry may be subject to drastically different rules for visibility. Hence, the time order of primitives with different rendering rules must be taken into account. If they are rendered in the order A, B, then C, primitive C will be the final visible surface. However, if the primitives are rendered in the order C, B, then A, primitive A will be the final visible surface. This illustrates how a deferred shading pipeline must preserve the time ordering of primitives, and correct pipeline state (for example, the depth test) must be associated with each primitive.

Deferred Shading Graphics Pipeline

Provisional U.S. patent application Ser. No. 60/097,336; filed Aug. 20, 1998, describes various embodiments of novel deferred Shading Graphics Pipelines. The present invention, and its various embodiments, is suitable for use as the Texture Block in the various embodiments of that differed shading graphics pipeline, or for use with other graphics pipelines which do not use differed shading. Details of such graphics pipelines are for convenience not described again herein.

Texture

The Texture Block of a graphics pipeline applies texture maps to the pixel fragments. Texture maps are stored in Texture Memory, which is typically loaded from the host computer's memory using the AGP interface. In one embodiment, a single polygon can use up to eight textures, although alternative embodiments allow any desired number of textures per polygon.

The inventive structure and method may advantageously make use of trilinear mapping of multiple layers (resolutions) of texture maps. Texture maps are stored in a Texture Memory which may generally comprise a single-buffered memory loaded from the host computer's memory using the AGP interface. In the exemplary embodiment, a single polygon can use up to eight textures. Textures are MIP-mapped. That is, each texture comprises a series of texture maps at different levels of detail, each map representing the appearance of the texture at a given distance from the eye point. To produce a texture value for a given pixel fragment, the Texture Block performs tri-linear interpolation from the texture maps, to approximate the correct level of detail. The Texture Block can, in conjunction with the Fragment Block, perform other interpolation methods, such as anisotropic interpolation.

The Texture Block supplies interpolated texture values (generally as RGBA color values) to the graphics pipeline shading block on a per-fragment basis. Bump maps represent a special kind of texture map. Instead of a color, each texel of a bump map contains a height field gradient. The multiple layers are MIP layers, and interpolation is within and between the MIP layers. The first interpolation is within each layer, then you interpolate between the two adjacent layers, one nominally having resolution greater than required and the other layer having less resolution than required, so that it is done three-dimensionally to generate an optimum resolution.

Detailed Description of Texture Pipeline

Figure 2:
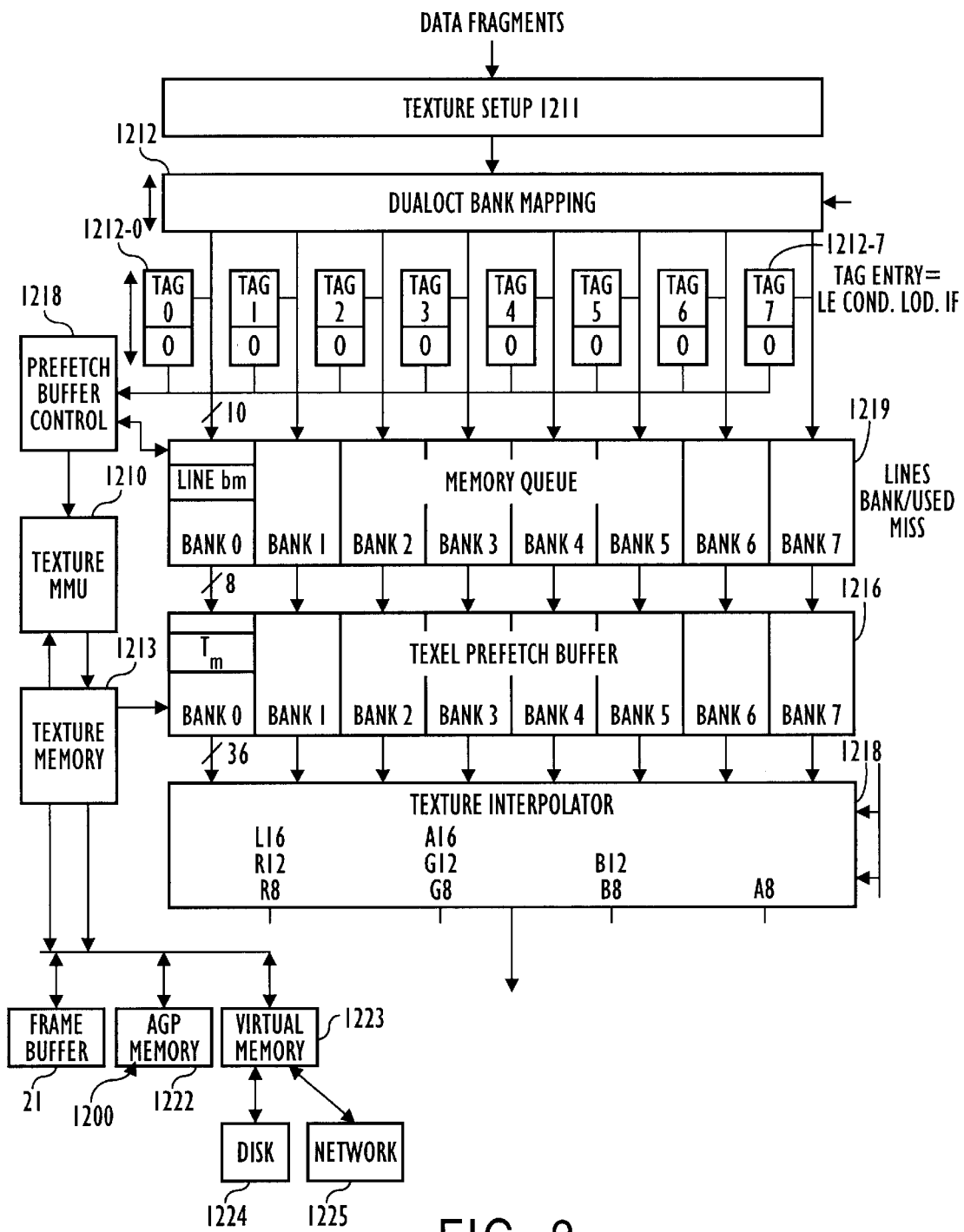
FIG. 2 is a block diagram of one embodiment of a texture pipeline constructed in accordance with the present invention.

Referring to FIG. 2, there is shown a block diagram of one embodiment of a texture pipeline constructed in accordance with the present invention. Texture unit 1200 receives texture coordinates for individual fragments, accesses the appropriate texture maps stored in texture memory, and generates a texture value for each fragment. The texture values are sent downstream, for example to a shading block which may then combine the texture value with other image information such as lighting to generate the final color value for a fragment.

Figure 3:
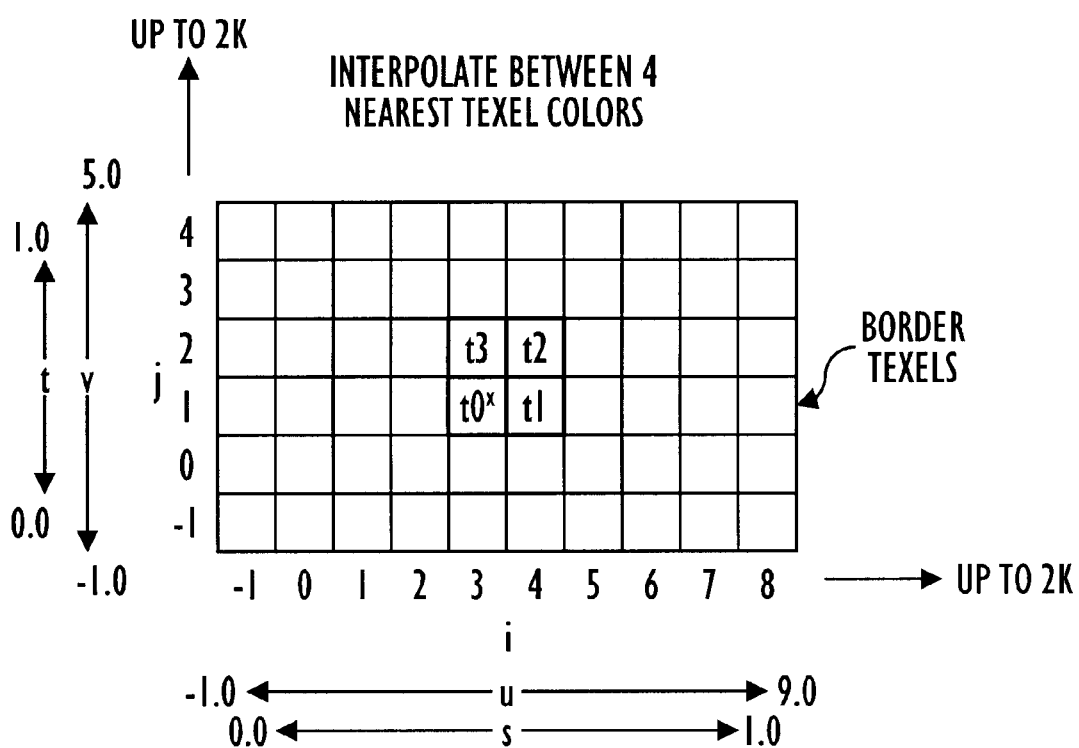
FIG. 3 depicts relations between coordinate systems with respect to graphic images.

Texture Setup 1211 receives data packets, for example, from the Fragment unit of U.S. Provisional Patent application No. 60/097,336. Data packets provide texture LOD data for the texture maps, and potentially visible fragment data for an image to be rendered. The fragment data includes (s, t, r) texture coordinates for each fragment. As shown in FIG. 3, the (s, t) coordinates are normalized texture space coordinates. For 3D textures, the "r" index is used to indicate texture depth. The s and t coordinates are floating point numbers. Texture setup 1211 translates the s, and t coordinates into i0, i1, j0, j1 (4 bilinear samples) and LODA/LODB (adjacent LODs for trilinear mipmapping) coordinates. The i0, i1, j0, j1 coordinates are 12 bit unsigned integers. LODA and LODB are 4 bit integers, for example with LODA being the stored LOD greater than the actual LOD, and LODB being the stored LOD less than the actual LOD. For 3D textures the r coordinate is converted into a k coordinate. In a trilinear mipmapping embodiment, each fragment has eight texture coordinates associated with it. The i, j, and LOD/k values are all transferred to Dualoct Bank Mapping unit 1212.

The Fragment Unit receives S, T, R coordinates in floating point format. Setup converts these S, T, R coordinates into U, V, W coordinates, which are fixed point coordinates used prior to texture look-up. The Texture Block then performs a texture look-up and provides i, j, k coordinates, which are integer coordinates mapped in normalized space. Thus, u=i x texture width, v=j x texture height, and w=k x texture depth.

Texture Maps

Texture maps are allocated to Texture Memory 1213 and Texel Prefetch Buffer 1216 using methods to minimize memory conflicts and maximize throughput. Dualoct Bank Mapping unit 1212 maps the i, j, and LOD/k coordinates into Texture Memory 1213 and Texel Prefetch Buffer 1216. Dualoct Bank Mapping unit 1212 also generates tags for texels stored in Texel Prefetch Buffer 1216. The tags are stored in the eight Tag Banks 1216-0 through 1216-7. The tags indicate whether a texel is stored in Texel Prefetch Buffer 1216, and the location of the texel in the buffer.

Texture Memory Management Unit (MMU) 1210 controls access to Texture Memory 1213. Texture Memory 1213 stores the active texture maps. If a texel is not found in Texel Prefetch Buffer 1216, then Texture MMU 1210 requests the texel from Texture Memory 1213. If the texel is from a texture map not stored in Texture Memory 1213 then the texture map can be retrieved from another source as is shown in FIG. 2. Texture memory has, in various embodiments, access to Frame buffer 1221, AGP memory 1222, Virtual memory 1223, with Virtual memory in turn having access to disk 1224 and network 1225. Thus, a variety of locations are available for texture addresses to be received in the event of a miss in order to greatly reduce the instances where a needed texel is ultimately not available at the time it is needed in the pipeline, since there is time between the determination of a texture cache miss and the time that texel is actually needed later on down the pipeline.

After the texels for a given fragment are retrieved, Texture Interpolator 1218 interpolates the texel color values to generate a color value for the fragment. The color value is then inserted into a packet and sent down the pipeline, for example to a shading block.

Figure 4A:
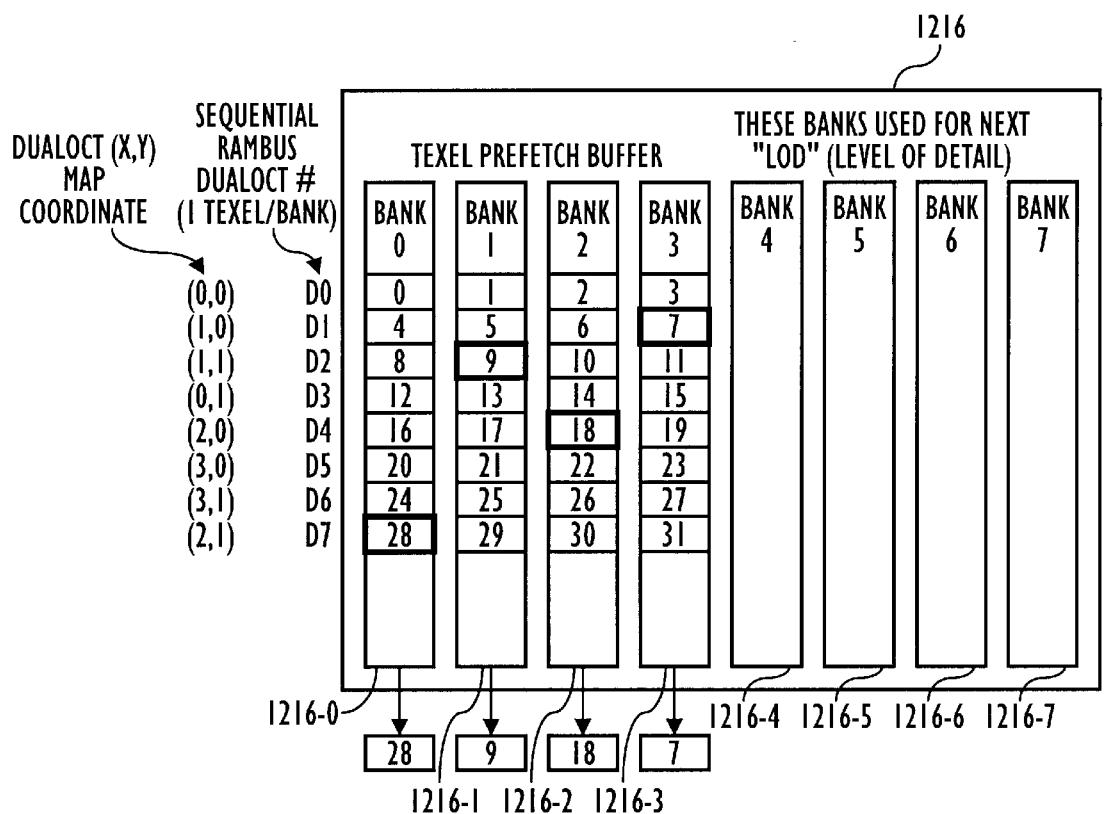
FIG. 4a is a block diagram depicting one embodiment of a texel prefetch buffer constructed in accordance with the teachings of this invention.
Figure 5:
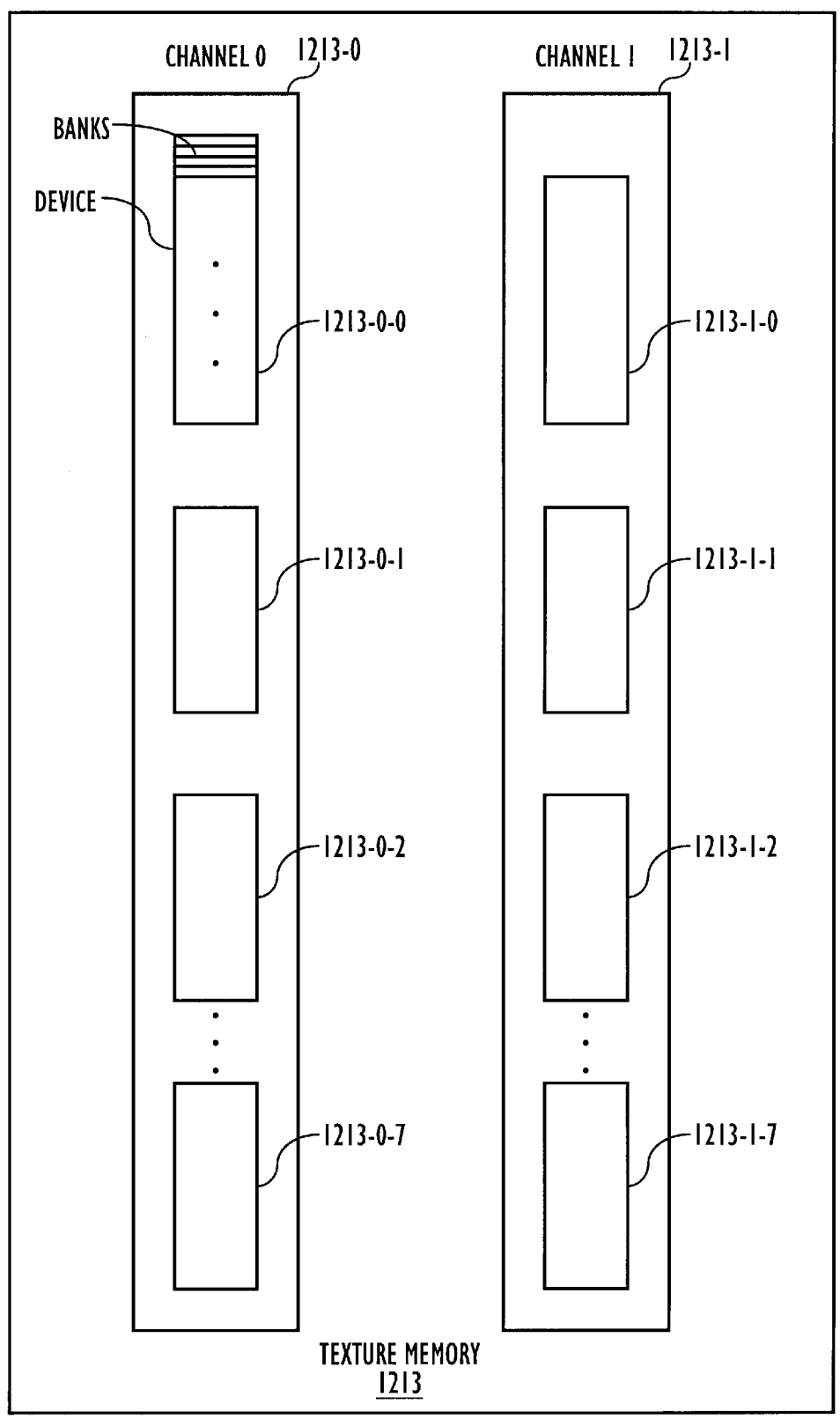
FIG. 5 is a diagram depicting texture memory organized into a plurality of channels, each channel containing a plurality of texture memory devices.

A texture array is divided into 2×2 texel blocks. Each texel block in an array is represented in Texture Memory. Texturing a given fragment with tri-linear mipmapping requires accessing two to eight of these blocks, depending on where the fragment falls relative to the 2×2 blocks. For trilinear mipmapping for each fragment, up to eight texels must be retrieved from memory. Ideally all eight texels are retrieved in parallel. As shown in FIG. 4a, to provide all eight texels in parallel, Texel Prefetch Buffer 1216 consists of eight independently accessible memory banks 1216-0 through 1216-7. Similarly, as shown in FIG. 5, Texture Memory 1213 includes a plurality of Texture Memory Devices, organized into a plurality of channels, such as channels 1213-0 and 1213-1. To access all eight texels in parallel from Texel Prefetch Buffer 1216 each texel must be stored in a separate Prefetch Buffer Bank.

Texture Tile Addressing

To maximize the memory throughput the texels in the texture maps are re-mapped into a spatially coherent form using texture tile addresses. The texels required to generate adjacent fragments depend upon the orientation of the object being rendered, and the depth location of the object in the scene. For example, adjacent fragments of a surface of an object at a large skew angle with respect to the viewing point will use texels at farther distances apart in the selected LOD than adjacent fragments of a surface that are approximately perpendicular to the viewing point. However, there is typically some spatial coherence between groups of fragments in close proximity and the texels used to generate texture for the fragments. Therefore, the texture tile addresses for the texels in the texture maps are defined so as to maximize the spatial coherence of the texture maps.

Figures 6C, 7:
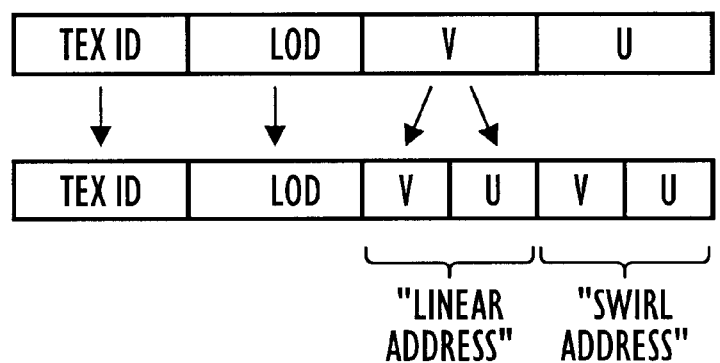
FIG. 6c depicts address mapping used in one embodiment of this invention.
FIG. 7 illustrates a super block of a texture map that is mapped using one embodiment of the present invention.

FIGS. 6a and 6a illustrate a spatially coherent texel mapping for texture memory 1213, including texture map 800, including texture "super blocks" 800-0 through 800-3. In one embodiment, a RAMBUS™, RAMBUS Corp., Mountain View Calif., memory is used for Texture Memory 1213. The smallest accessible data structure in RAMBUS memory is a "Dualoct" which is 16 bytes. Each texel contains 32 bits of color data in the format RGBA-8, or Lum/Alpha 16. Four texels can therefore be stored in each dualoct. The X and Y axis of FIGS. 6a and 6b include dualoct labels. The (X,Y) coordinates correspond to the (i, j) coordinates with the least significant bit of (i, j) dropped. FIG. 6a illustrates how the texels are renumbered within each dualoct. The texels are numbered sequentially starting at the origin of each dualoct and increasing sequentially in a counterclockwise order. FIG. 6c shows how texel locations are remapped from linear addressing to a reconfigured address including a "swirl address" portion.

Referring to FIG. 6b, sector 800-0-0 shows the swirl pattern mapping for 16 dualocts. The four bit labels in each dualoct indicate the dualoct number that is used to generate an address for storing the dualoct in RAMBUS Texture Memory 1213 and Texel Prefetch Buffer 1216. Each dualoct shown in FIG. 6b contains 4 texels arranged as shown in FIG. 6a. Dualocts are renumbered sequentially in groups of four, starting at the origin and moving in a counter-clockwise direction. After renumbering a group of dualocts, the next group of four dualocts are selected moving in a counter clockwise direction around the sector. After all four groups in a sector have been renumbered, the renumbering pattern is repeated for the next sector (i.e., sector 800-0-1) moving counter-clockwise around a dualoct block. For example, after the 16 dualocts in sector 800-0-0, the dualoct numbers continue in sector 800-0-1 which contains dualoct numbers 16–30 which are numbered in the same pattern as sector 800-0-0. This pattern is then repeated in sector 800-0-2 and in sector 800-0-3. Dualoct block 0 (800-0) consists of the four sectors 800-0-0 through 800-0-3. The dualoct block 0 pattern is then repeated in dualoct block 1 (800-1) starting with dualoct number 64, followed by dualoct block 2 (800-2), and dualoct block 3 (800-3). In one embodiment, the recursive swirl pattern stops at the texture super block 0 (800) level.

Alternative spatially coherent patterns are used in alternative embodiments, rather than the recursive swirl pattern illustrated in FIGS. 6a and 6b. FIG. 7 illustrates a super block 900 of a texture map that is mapped using one such alternative pattern. Super block 900 includes sectors 0–15. The dualoct numbering pattern within each sector is the same for the super block 900 pattern as for texture super block 0 (800) shown in FIG. 8. However, rather than repeating the counter-clockwise swirl pattern at the sector level, the dualoct numbers at the sector level follow the pattern indicated by the sector numbers 0–15 in FIG. 7, limiting the swirl size to 64×64 texels.

Figure 8:
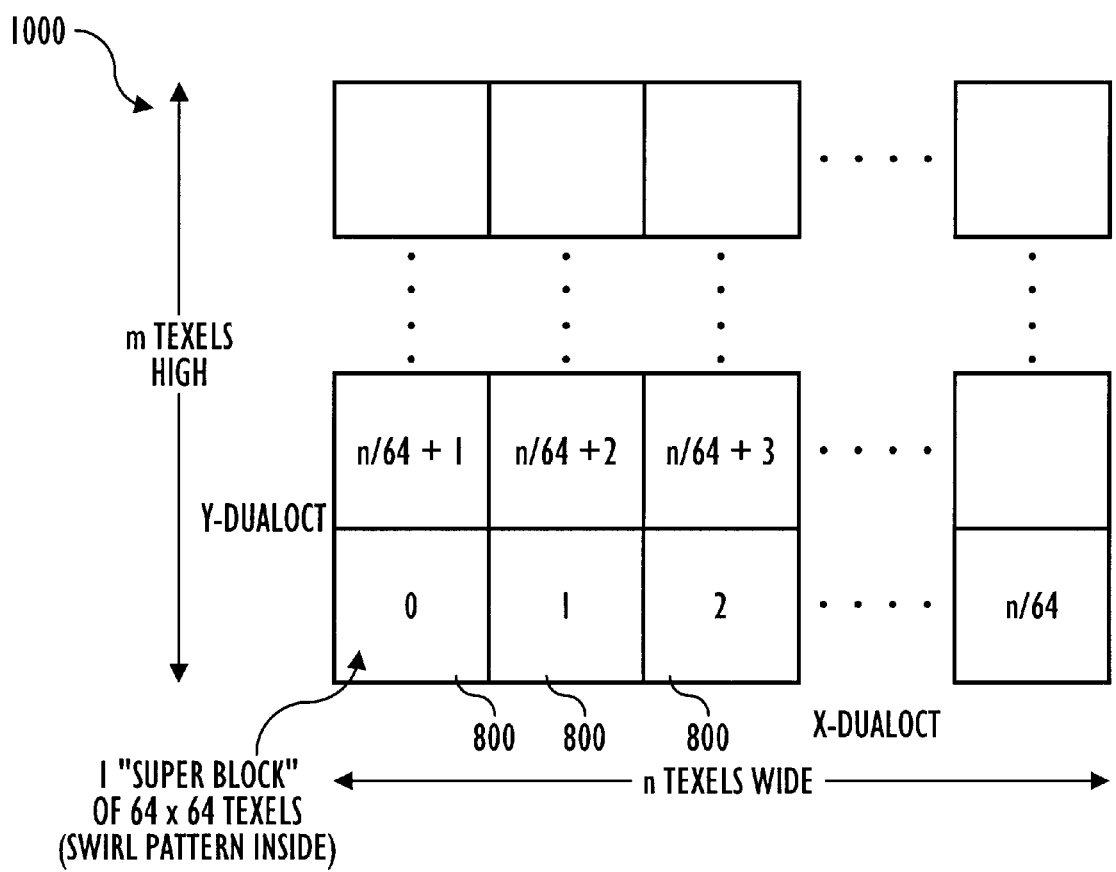
FIG. 8 shows a dualoct numbering pattern within each sector in accordance with one embodiment of this invention.

FIG. 8 illustrates the dualoct numbering pattern at the super block level of a texture map 1000. At the super block level the pattern changes to a simple linear mapping, since in certain embodiments it has been determined that beyond 64×64 texels recursive swirling patterns begin to hurt spatial locality. The swirling is inherently a square operation, implying that it does not work very well at large sizes of rectangular but non-square textures, and textures with border information. Limiting the swirl to 64×64 in certain embodiments of this invention, limits the minimum allocated size to a manageable amount of memory. In accordance with this invention, the swirling scheme provides that, upon servicing a miss request, the four samples fetched will reside in distinct memory banks of the prefetched buffer, thus avoiding bank conflict. Furthermore, the swirling scheme maximizes subsequent hits to the prefetched buffer so that misses are typically spread out, so the memory system can service requests while the texture unit is working on hit data, thus minimizing stalls. The next super block of dualocts after texture super block 0 (800) is located directly to the right of texture super block 0 (800). This linear pattern is repeated until super block n/64, and then a new row of super blocks is started with super block n/64+1, as shown.

Figure 9:
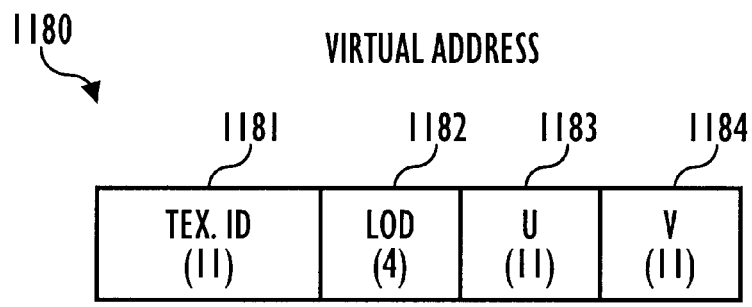
FIG. 9 is texture tile address structure which serves as a tag for a texel prefetch buffer in accordance with one embodiment of this invention.

The spatially coherent texel mapping patterns illustrated in FIGS. 8a, 8b and 9 are designed to maximize the likelihood that the four texels used to generate texture for a fragment will be stored either in separate Texel Prefetch Buffer 1216 banks, or separate Texture Memory 1213 devices.

Memory Addressing

Referring to FIG. 4a, Texel Prefetch Buffer 1216 includes eight Prefetch Buffer Banks 1216-0 through 1216-7. FIG. 4a shows how the numbered dualocts in FIG. 6b map into the eight Prefetch Buffer Banks 1216-0 through 1216-7. Also shown are the four texels fetched for a particular pixel location 899, shown in FIG. 6a, appearing without a memory conflict. FIG. 4a shows the texels stored for one LOD. For trilinear mipmapping, Banks 1216-4 through 1216-7 contain texels for the second LOD.

Referring to FIG. 5, there is shown a block diagram of one embodiment of Texture Memory 1213. Texture Memory 1213 has two channels 1213-0 and 1213-1. Each channel contains eight devices 1213-0-0 through 1213-0-7 and 1213-1-0 through 1213-1-7, respectively. Each device has an independent set of addresses and independent I/O data lines to allow data to be independently accessed in each of the eight devices. Each device contains sixteen banks, meaning that in this embodiment there are 256 open pages, clearly reducing the likelihood of memory conflict. In one embodiment each channel is a 64 Mbyte memory.

To map the texels in the texture map into a spatially coherent format, Dualoct Bank Mapping unit 1212 generates a texture tile address for each dualoct. FIG. 9 illustrates a texture tile address data structure 1180 according to one embodiment of the present invention. Texture Field ID 1181 field is an 11 bit field that defines the texture that is being referenced. Up to 2048 different textures can be used in a single display. These textures may be stored in any memory resource. Each fragment may then reference up to eight different textures. When a texture is referenced that is not in Texture Prefetch Buffer 1216, Texture MMU 1210 loads the memory from an external memory resource, and if necessary de-allocates the required Texture Prefetch Buffer 1216 space to load the new texture. The LOD 1182 field is a 4 bit field that defines the LOD to be used in the selected texture map. The U, V fields 1183 and 1184 are 11 bit fields for texture coordinates with a range from 0–2047. The U, V fields for each dualoct are defined to generate the spatially coherent format, such as the format shown in FIGS. 8a and 8b. For 3D textures, the 4 LSB's of the Texture field ID 1181 contain the 4 MSB's of the texture R coordinate, which is a texture depth index generated from the k coordinate. Dualoct Bank Mapping unit 1212 provides the four R coordinate bits whenever a 3D texture operation is in the pipeline. Thereafter, 3D texture tile addresses are essentially treated the same as 2D and 1D addresses.

Figure 10:
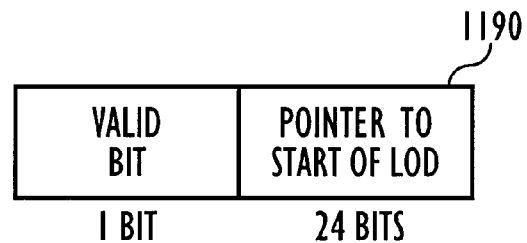
FIG. 10 is a pointer look-up translation tag block used as a pointer to base address within texture memory for the start of the desired texture/LOD in accordance of one embodiment of this invention.

The texture tile address is provided to Texture MMU 1210 which generates a corresponding texture memory address. Texture MMU 1210 performs the texture tile address to texture memory address translation using a linear mapping of the texture tile address into a table of texture memory addresses stored in Texture Memory 1213. This table is maintained by software. FIG. 10 illustrates a texture memory address data structure 1280 for a RAMBUS™ Texture Memory 1213. Texture memory address data structure 1280 is designed to maximize the likelihood that the dualocts required to generate the texture for a fragment will be stored in different Texture Memory pages, as shown in FIG. 5. In one embodiment, Device field 1285 consists of the least significant 3 bits of the texture memory address data structure 1280. Device field 1285 defines the texture memory device that a dualoct is stored in. Therefore, each sequential dualoct, as defined by the mapped texture, is stored in a different texture memory device. The Bank field 1284 comprises the next four low order bits, followed by a 1 bit Channel field 1283, a 9 bit Row field 1282 and a 6 bit Column field 1281.

The texture memory address data structure 1280 is also programmable. This allows the texture memory address to accommodate different memory configurations, and to alter the placement of bit fields to optimize the access to the texture data. For example, an alternative memory configuration may have more than eight texture memory devices.

Figure 4B:
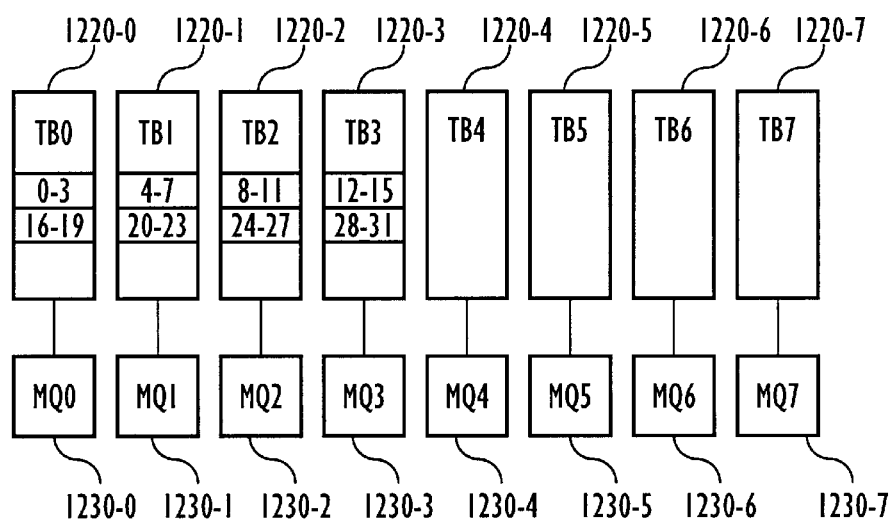

Texels are loaded from Texture Memory 1213 into Texel Prefetch Buffer 1216 to provide higher speed access. When texels are moved into Texel Prefetch Buffer 1216, a corresponding tag is created in one of the eight Prefetch Buffer Tag Blocks 1220-0 through 1220-7, shown in FIG. 4b. Each of the eight Tag Blocks 1220-0 through 1220-7 has a corresponding memory Queue 1230-0 through 1230-7. Note that the tags are 64 entries, and the cache SRAM's are 256 entries. This mapping allows each Prefetch Buffer tag entry to map a "line" of 4 texels across four Prefetch Buffer Banks, as shown in Texel Prefetch Buffer 1216 in FIG. 4a. This mapping allows 4 texels to be retrieved from four separate Prefetch Buffer Banks every cycle, thus ensuring maximum texture data access bandwidth. Each Tag Block may receive up to one texture tile address per cycle. The texture tile address points to a particular dualoct of 4 texels. Each Tag Block entry points to one dualoct line of texels in Texel Prefetch Buffer 1216 memory. The incoming texture tile address is checked against the contents of the Tag Block to determine whether the desired dualoct is stored in Texel Prefetch Buffer 1216.

FIG. 4a shows the texels stored for one LOD. For trilinear mipmapping, Banks 1216-4 through 1216-7 contain texels for the second LOD. The Texture ID 1181 bit [26] in the texture tile address is used to control whether an LOD gets mapped to Prefetch Buffer Banks 0–3 (1216-0 through 1216-3) or Banks 4–7 (1216-4 through 1216-7). If Texture ID 1181 bit [26]=0, then the even LOD's (LOD[22]=0) are maped into Prefetch Buffer Banks 0–3, and the odd LOD's (LOD[22]=1) are mapped into Prefetch Buffer Banks 4–7. Conversely, if Texture ID[26]=1 then the odd LOD's are mapped into Prefetch Buffer Banks 0–3, and the even LOD's are mapped into Prefetch Buffer Banks 4–7. This mapping ensures that all eight tags can be accessed in each cycle, and that texture information is evenly distributed in the caches. Dualoct Bank Mapping unit 1212 also follows this LOD mapping rule when sending texture tile addresses to the corresponding Tag Block 1220-0 through 1220-7, shown in FIG. 4b.

To generate a texture for a fragment, Dualoct Bank Mapping unit 1212 generates up to eight dualoct requests, and sends them to the appropriate Prefetch Buffer Bank. The Prefetch Buffer Tags 1220-0 through 1220-7 are checked for a match. If there is a hit, the request is sent to the appropriate bank of Memory Queue 1219. When the memory request exits Memory Queue 1219, the line number is sent to Texel Prefetch Buffer 1216 to look-up the data. If there is a miss on a given texture tile address, then a miss request is put into the miss queue for the corresponding tag block. The miss address is eventually read out of the miss queue and forwarded to Texture MMU 1210. The miss request is then serviced, the data is retrieved from Texture Memory 1213 or another external memory source, and is ultimately provided to the appropriate Texel Prefetch Buffer Banks 1216-0 through 1216-7.

Each line in Memory Queue 1219 records one memory access for a particular texture operation on one fragment of data. Memory requests are received at the top of Memory Queue 1219, and when they reach the bottom, Texel Prefetch Buffer 1216 is accessed for the data. Miss data is only filled into Texel Prefetch Buffer 1216 when a particular miss request reaches the bottom of the corresponding memory Queue 1230-0 through 1230-7.

Each of the eight memory Queues 1230-0 through 1230-7 hold up to eight pending miss addresses for a particular Prefetch Buffer Bank 1216-0 through 1216-7. If a memory Queue is not empty, then it can be assumed to contain at least one valid address. Every clock cycle Prefetch Buffer Controller 1218 scans the memory Queues 1230-0 through 1230-7 searching for a valid entry. When a miss address is found, it is sent to Texture MMU 1210.

FIG. 9 is a Texture Tile Address Structure which serves as the tag for Texel Prefetch Buffer 1216. When this tag indicates a Texel Prefetch Buffer miss, a Texture Memory 1213 look-up is needed. The Virtual Address Structure includes an 11 bit texture ID 1181, a four bit LOD 1182, and 11 bit U and V addresses 1183 and 1184. This Virtual Address of FIG. 9 serves as a tag entry in tag memories 1212-0 through 1212-7 (FIG. 2). In the event of a miss, a look-up in Texture Memory 1213 is required.

Figure 11:
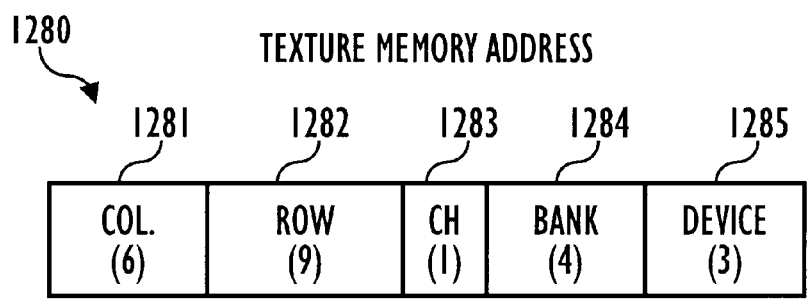
FIG. 11 is one embodiment of a physical mapping of texture memory address.

FIG. 10 depicts pointer look-up translation tag block 1190, which is stored, for example, in a dedicated portion of the texture memory, and is addressed using the 11 bit texture ID and four bit LOD number, forming a 15 bit index to locate the pointer of FIG. 10. The pointer, once located, points to a base address within texture memory where the start of the desired texture/LOD is stored. This base address is then appended by addresses to be created by the U and V components of the virtual address to create the virtual address of a dualoct, which in turn is mapped to the physical address of RAMBus memory using the address structure of FIG. 11.

Figure 12:
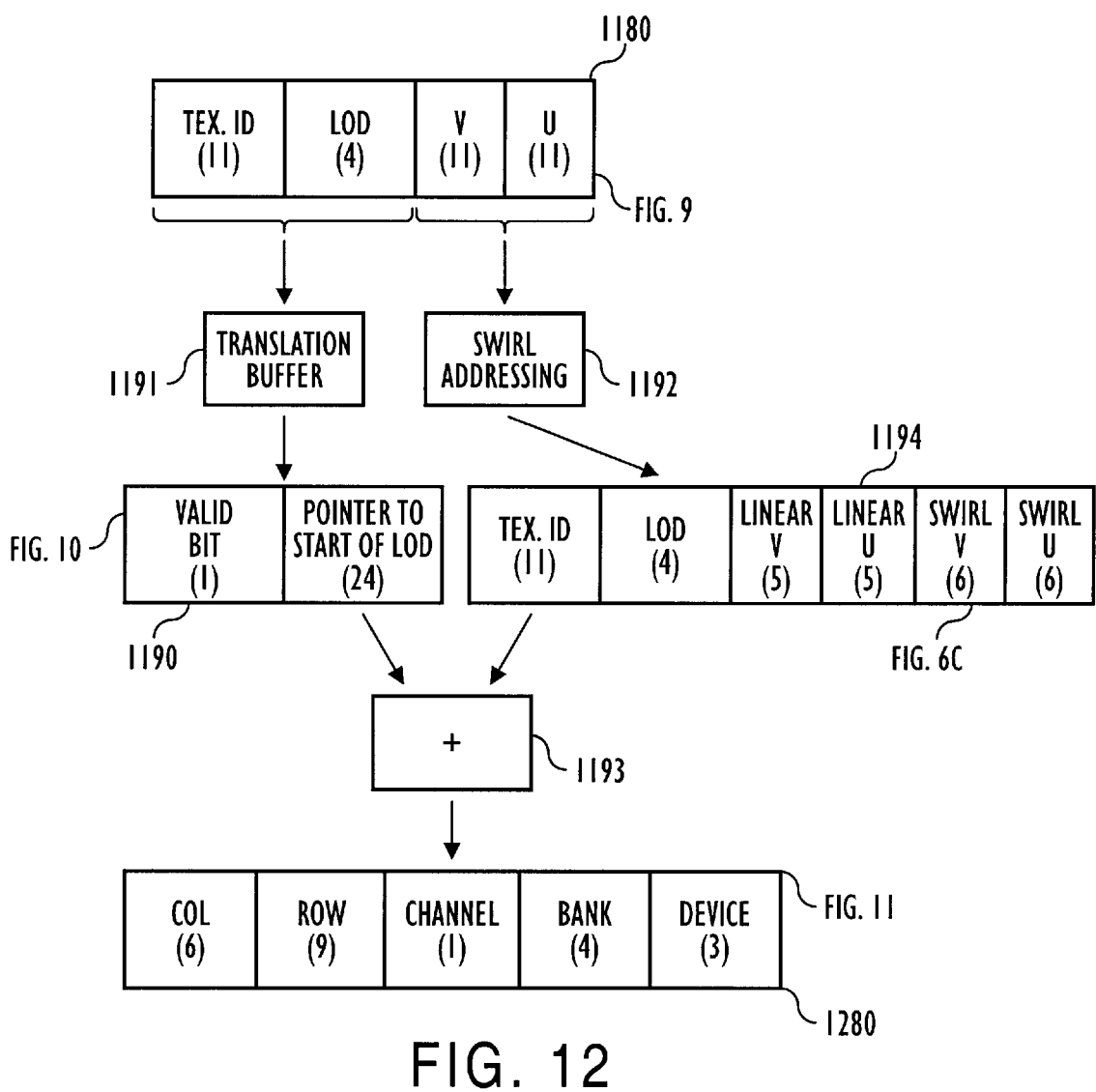
FIG. 12 is a diagram depicting address reconfigurations and process with respect to FIGS. 6c, 9, 10, and 11.

FIG. 12 is a diagram depicting the address reconfigurations and process for re-configuring the addresses with respect to FIGS. 6c, 9, 10, and 12. As shown in FIG. 12, texture tile address structure 1180 (previously discussed with reference to FIG. 9) serves as a tag for Texel Prefetch Buffer 1216. When this tag indicates a Texel Prefetch Buffer miss, a texture memory 1213 look-up is needed. Translation buffer 1191 uses the 11-bit texture ID and four-bit LOD to form a 15 bit index to pointer look-up translation tag block 1190 (previously discussed with reference to FIG. 10). Swirl addresses block 1192 remaps the bits from texture tile address data structure 1180 to form the "swirl address" 1194 (previously discussed with respect to FIGS. 6a–6c). Adder 1193 combines the pointer look-up translation tag block 1190 and "swirl address" 1194 to form the physical address 1280 to address RAMBus memory (as previously discussed with respect to FIG. 11).

Reorder Logic

Figure 13A:
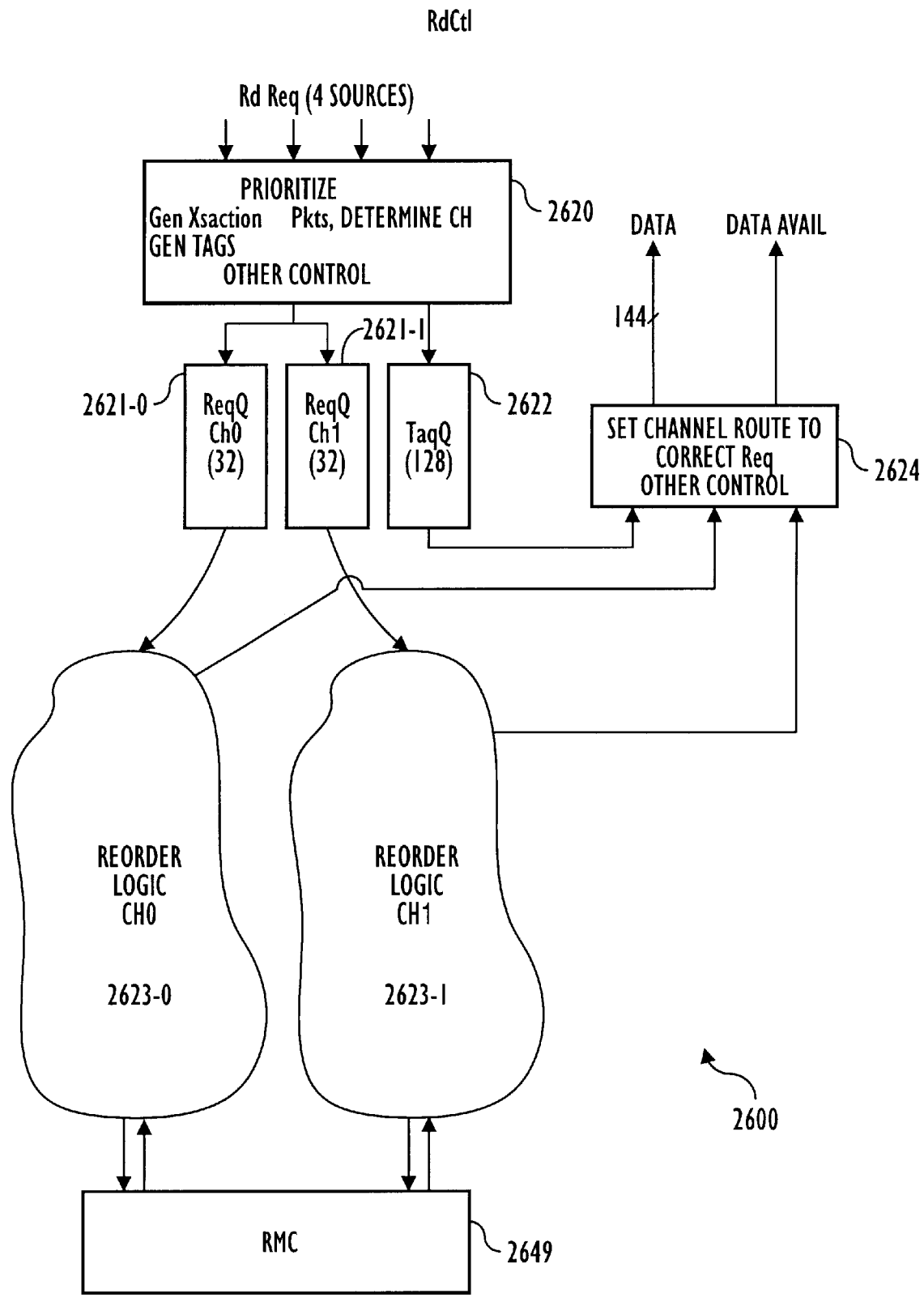
FIGS. 13a and 13b are block diagrams depicting one embodiment of a re-order system in accordance of the present invention.

FIG. 13a is a block diagram depicting one embodiment of Read Miss Control Circuitry 2600. Read Miss Control Circuitry 2600 receives a read miss request from the miss logic shown in FIG. 2, when the tag mechanism determines that the desired information is not contained in texel prefetch buffer 1216. There are four types of read miss requests: texture look-up (miss), copy texture, read texture, and Auxring read dualoct (a maintenance utility function). The read miss requests received by read control circuitry 2600 are prioritized by prioritization block 2620, for example, in the order listed above. Prioritization block 2620 sends the read request to the appropriate channel based upon the channel bit (FIG. 8) contained in the texture memory address to be accessed. These addresses are thus sent to request queues 2621-0 and 2621-1, which, in one embodiment, are 32 addresses deep. The addresses stored in request queues 2621-0 and 2621-1 are applied to reorder logic circuitry 2623-0 and 2623-1, respectively, which in turn access RAMBus memory controller 2649. Reorder logic 2623-0 and 2623-1 reorder the addresses received from request queues 2621-0 and 2621-1 in order to avoid memory conflict in texture memory, as will be described with respect to FIG. 13b. Since reorder logic 2623-0 and 2326-1 reorder the memory addresses to be accessed by RAMBus memory controller 2649, tag queue 2622 keeps track of channel and requester information. The accessed data is output to in-order return queue 2624, where the results are placed in the appropriate slots based upon the original order as indicated by queues 2609 and 2610. The data, once stored in proper order in in-order return queue 2624 is then provided to its requestor as data and a data valid signal. In one embodiment, the data is output in a 144 bits wide, which corresponds to a dualoct.

Figure 13B:
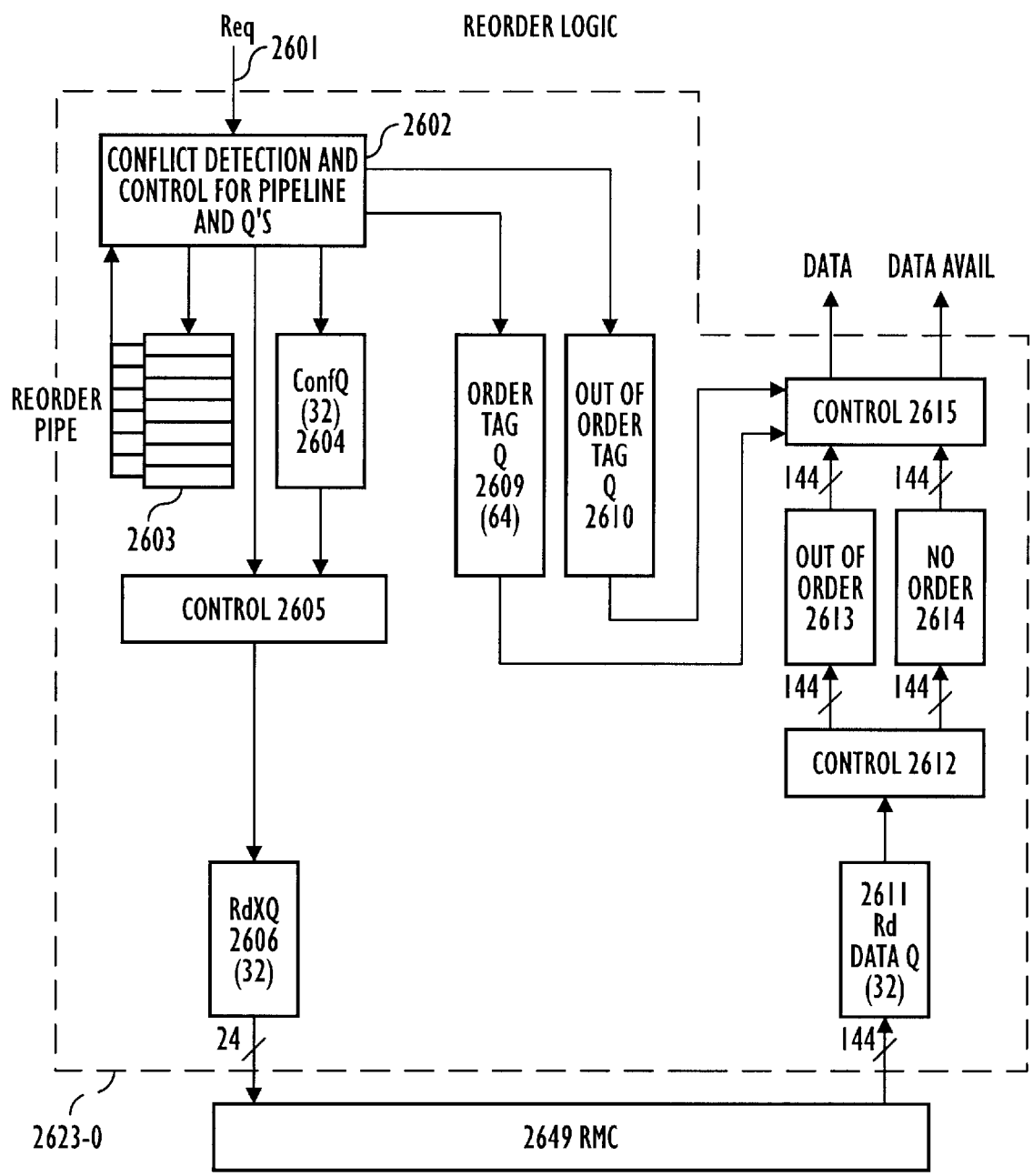

FIG. 13b is a block diagram of one embodiment of this invention which includes reorder logic 2623-0 (with reorder logic 2623-1 being identical), and showing RAMBus memory controller 2649. The purpose of reorder logic 2623 is to monitor incoming address requests and reorder those requests so as to avoid memory conflicts in RAMBus memory controller 2649. For each memory address received as a request on Bus 2601, conflict detection block 2602 determines if a memory conflict is likely to occur based upon the addresses contained in first level reorder queue 2603. If not, that address is directly forwarded to control block 2605, and is added to first level reorder queue 2603, to allow for conflict checking of subsequently received addresses. On the other hand if a conflict is determined by conflict detection block 2602, the conflicting address request is sent to conflict queue 2604. In one embodiment, in order to prevent conflicting address requests from being utilized too distant from other requests received in the same recent time frame, 32 address requests are received by conflict detection block 2602 and either forwarded to control block 2605 (no conflict), or placed in conflict queue 2604, after which the addresses stored in conflict queue 2604 are output to control circuit 2605. In this manner, the reordered address requests are applied to reordered address queue 2606 to access RAMBus memory controller 2649 with fewer, and often times zero, conflicts, in contrast to the conflict situations which would exist if the original order of the read request were applied directly to RAMBus memory controller 2649 without any reordering.

In-Order tag queue 2609 and out-of-order tag queue 2610 maintains tag information in order to preserve the original address order so that when the results are looked up and output from reorder logic 2623-0 and 2623-1, the desired (original) order is maintained.

Information read from RAMBus memory controller 2649 is stored in read data queue 2611. Through control block 2612, data from queue 2611 is forwarded to either out-of-order queue 2613 or in-order queue 2614. Control block 2615 reassembles data from queues 2613 and 2614 in the original request order and forwards it to the appropriate channel port of block 2614 in order. Control block 2624 receives channel specific data from blocks 2623-0 and 2623-1 which is then re-associated and issued back to the waiting requester.

The inventive pipeline includes a texture memory which includes a prefetch buffer. The host also includes storage for texture, which may typically be very large, but in order to render a texture, it must be loaded into texture memory. Associated with each VSP are S and T's. In order to perform trilinear MIP mapping, we necessarily blend eight (8) samples, so the inventive structure provides a set of eight content addressable (memory) caches running in parallel. In one embodiment, the cache identifier is one of the content addressable tags, and that's the reason the tag part of the cache and the data part of the cache are located separate. Conventionally, the tag and data are co-located so that a query on the tag gives the data. In the inventive structure and method, the tags and data are split up and indices are sent down the pipeline.

The data and tags are stored in different blocks and the content addressable look-up is a look-up or query of an address, and even the "data" stored at that address in itself an index that references the actual data which is stored in a different block. The indices are determined, and sent down the pipeline so that the data referenced by the index can be determined. In other words, the tag is in one location, the texture data is in a second location, and the indices provide a link between the two storage structures.

In one embodiment of the invention, the prefetch buffer comprises a multiplicity of associative memories, generally located on the same integrated circuit as the texel interpolator. In the preferred embodiment, the texel reuse detection method is performed in the Texture Block.

In conventional 3-D graphics pipelines, an object in some orientation in space is rendered. The object has a texture map associated with it, which is represented by many triangle primitives. The procedure implemented in software, will instruct the hardware to load the particular object texture into a Texture Memory. Then all of the triangles that are common to the particular object and therefore have the same texture map are fed into the unit and texture interpolation is performed to generate all of the colored pixels needed to represent that particular object. When that object has been colored, the texture map in DRAM can be destroyed since, for example by a reallocation algorithm, the object has been rendered. If there are more than one object that have the same texture map, such as a plurality of identical objects (possibly at different orientations or locations), then all of that type of object may desirably be textured before the texture map in DRAM is discarded. Different geometry may be fed in, but the same texture map could be used for all, thereby eliminating any need to repeatedly retrieve the texture map from host memory and place it temporarily in one or more pipeline structures.

In more sophisticated conventional schemes, more than one texture map may be retrieved and stored in the memory, for example two or several maps may be stored depending on the available memory, the size of the texture maps, the need to store or retain multiple texture maps, and the sophistication of the management scheme. Each of these conventional texture mapping schemes, spatial object coherence is of primary importance. At least for an entire single object, and typically for groups of objects using the same texture map, all of the triangles making up the object are processed together. The phrase spatial coherency is applied to such a scheme because the triangles form the object and are connected in space, and therefore spatially coherent.

In the inventive structure and method, a sizable memory is supported on the card. In one implementation 128 megabytes are provided, but more or fewer megabytes may be provided. For example, 32 Mb, 64 Mb, 256 Mb, 512 Mb, or more may be provided, depending upon the needs of the user, the real estate available on the card for memory, and the density of memory available.

Rather that reading the eight texels for every visible fragment, using them, and throwing them away so that the eight texels for the next fragment can be retrieved and stored, the inventive structure and method stores and reuses them when there is a reasonable chance they will be needed again.

It would be impractical to read and throw away the eight texels every time a visible fragment is received. Rather, it is desirable to make reuse of these texels, because if you're marching along in tile space, your pixel grid within the tile (typically processed along sequential rows in the rectangular tile pixel grid) could come such that while the same texture map is not needed for sequential pixels, the same texture map might be needed for several pixels clustered in an area of the tile, and hence needed only a few process steps after the first use. Desirably, the invention uses the texels that have been read over and over, so when we need one, we read it, and we know that chances are good that once we have seen one fragment requiring a particular texture map, chances are good that for some period of time afterward while we are in the same tile, we will encounter another fragment from the same object that will need the same texture. So we save those things in this cache, and then on the fly we look-up from the cache (texture reuse register) which ones we need. If there is a cache miss, for example, when a fragment and texture map are encountered for the first time, that texture map is retrieved and stored in the cache.

Texture Map retrieval latency is another concern, but is handled through the use of First-In-First-Out (FIFO) data structures and a look-ahead or predictive retrieval procedure. The FIFO's are large and work in association with the CAM. When an item is needed, a determination is made as to whether it is already stored, and a designator is also placed in the FIFO so that if there is a cache miss, it is still possible to go out to the relatively slow memory to retrieve the information and store it. In either event, that is if the data was in the cache or it was retrieved from the host memory, it is placed in the unit memory (and also into the cache if newly retrieved).

Effectively, the FIFO acts as a sort of delay so that once the need for the texture is identified (prior to its actual use) the data can be retrieved and re-associated, before it is needed, such that the retrieval does not typically slow down the processing. The FIFO queues provide and take up the slack in the pipeline so that it always predicts and looks ahead. By examining the FIFO, non-cached texture can be identified, retrieved from host memory, placed in the cache and in a special unit memory, so that it is ready for use when a read is executed.

The FIFO and other structures that provide the look-ahead and predictive retrieval are provided in some sense to get around the problem created when the spatial object coherence typically used in per-object processing is lost in our per-tile processing. One also notes that the inventive structure and method makes use of any spatial coherence within an object, so that if all the pixels in one object are done sequentially, the invention does take advantage of the fact that there's temporal and spatial coherence.

The Texture Block caches texels to get local reuse. Texture maps are stored in texture memory in 2×2 blocks of RGBA data (16 bytes per block) except for normal vectors, which may be stored in 18 byte blocks.

Virtual Texture Numbers

The user provides a texture number when the texture is passed from user space with OpenGL calls. The user can send some triangles to be textured with one map and then change the texture data associated with the same texture number to texture other triangles in the same frame. Our pipeline requires that all sets of texture data for a frame be available to the Texture Block. The driver assigns a viral texture number to each texture map.

Texture Memory

Texture Memory stores texture arrays that the Texture Block is currently using. Software manages the texture memory, copying texture arrays from host memory into Texture Memory. It also maintains a table of texture array addresses in Texture Memory.

Texture Addressing

The Texture Block identifies texture arrays by virtual texture number and LOD. The arrays for the highest LODs are lumped into a single record. A texture array pointer table associates a texture array ID (virtual texture number concatenated with the LOD) with an address in Texture Memory. We need to support thousands of texture array pointers, so the texture array pointer table will have to be stored in Texture Memory. We need to map texture array IDs to addresses approximately 500M times per second. Fortunately, adjacent fragments will usually share the same the texture array, so we should get good hit rates with a cache for the texture array pointers. (In one embodiment, the size of the texture array cache is 128 entries, but other sizes, larger or smaller, may be implemented.)

The Texture Block implements a direct map algorithm to search the pointer table in memory. Software manages the texture array pointer table, using the hardware look-up scheme to store table elements.

Texture Memory Allocation

Software handles allocation of texture memory. The Texture Block sends an interrupt to the host when it needs a texture array that is not already in texture memory. The host copies the texture array from main memory frame buffer to texture memory, and updates the texture array pointer table, as described above. The host controls which texture arrays are overwritten by new data.

The host will need to rearrange texture memory to do garbage collection, etc. The hardware will support the following memory copies:

host to memory memory to host memory to memory

Alternative Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A graphics pipeline processor comprising:

a texture unit generating texture values; and a texture memory associated with and coupled to said texture unit;

said texture unit interpolating a plurality of MIP-mapped texture maps stored in said texture memory at different levels of detail to produce a texture value for a given pixel fragment that approximates the correct level of texture detail each of the levels of detail including an array of texels grouped into texel blocks and applying said interpolated texture value to pixel fragments;

each of the levels of detail including an array of texels grouped into texel blocks, each texture map representing the appearance of the texture at a given distance from an eye point;

a texel prefetch buffer storing prefetched texel blocks previously read from said texture memory; and a prefetch tag memory storing tags corresponding to the prefetched texel blocks and used to determine which of the texel blocks are stored in the texel prefetch buffer in order to avoid re-reading a previously read one of the texel blocks from the texture memory;

said tags indicating whether a texel block is stored in the texel prefetch buffer and indicating the location of the texel block in the texel prefetch buffer, the prefetch buffer tag blocks checking a plurality of texture addresses against the stored tags thereby checking for a match, each tag comprising (1) the texture identifier; (2) the level of detail indicator; (3) the texture U-coordinate of the stored texel block; and (4) the texture V-coordinate of the stored texel block;

said texture memory, said texel prefetch buffer, and said prefetch tag memory storing and accessing texture data so that memory access conflicts are reduced and throughput of said texture unit is increased.

2. A deferred graphics pipeline processor as in claim 1, wherein said tags are configured to allow the prefetched texel blocks to be independently prefetched from any texture map and any level of detail.

3. A deferred graphics pipeline processor as in claim 2, wherein said texel block prefetch independence is achieved by providing tags having: (1) a texture identifier; (2) a level of detail indicator; (3) a texture U-coordinate of the stored texel block; and (4) a texture V-coordinate of the stored texel block.

4. A deferred graphics pipeline processor as in claim 3, wherein said texture unit performing tri-linear interpolation from said texture maps to produce a texture value for a given pixel fragment that approximates the correct level of detail.

5. A texture device for a graphics rendering pipeline, the pipeline receiving a plurality of graphics primitives and generating a rendered image, at least some of the graphics primitives being rendered with at least one texture map, the texture device comprising:

logic receiving texture coordinates corresponding to a pixel fragment;

bank mapping logic translating each of the texture coordinates to a plurality of texture tile addresses, each of the texture tile addresses comprising: (1) a texture identifier; (2) a level of detail indicator; (3) a texture U-coordinate of the stored texture element (texel) block; and (4) a texture V-coordinate of the stored texel block;

a texture memory storing the texture maps, each of the texture maps being an array of texels, the texels grouped into texel blocks;

a texel prefetch buffer storing prefetched texel blocks, the prefetched texel blocks being the texel blocks read from the texture memory, the texel prefetch buffer organized into a plurality of banks, the number of the banks within the texel prefetch buffer being an integer multiple of the number of texels in the texel block, the texels in any of the prefetched texel blocks being stored in separate ones of said banks, the banks operating in parallel;

a plurality of prefetch buffer tag blocks storing tags, the tags each corresponding to one stored texel block, the tags indicating whether a texel block is stored in the texel prefetch buffer and indicating the location of the texel block in the texel prefetch buffer, the prefetch buffer tag blocks checking the plurality of texture tile addresses against the stored tags in one clock cycle thereby checking for a match, each tag comprising (1) the texture identifier; (2) the level of detail indicator; (3) the texture U-coordinate of the stored texel block; and (4) the texture V-coordinate of the stored texel block; and prefetch buffer control logic reading the stored texel blocks from the texture memory when the checking does not indicate a needed texel block is not in the texel prefetch buffer.

6. The texture device of claim 5, further comprising:

a plurality of miss queues storing the texture tile addresses that are checked by the prefetch buffer tag blocks and are not present in the prefetch buffer tag blocks;

the prefetch buffer control logic further comprising logic reading the miss queues to determine which tile addresses need to be used to read texel blocks from the texture memory; and a texture memory management unit translating the texture tile addresses into memory addresses.

7. The texture device of claim 6, further comprising:

a texture array pointer table associating a plurality of texture array identifiers with a corresponding address in the texture memory, each of the texture array identifiers being the combination of the texture identifier and the level of detail; and the texture memory management unit further comprising logic for reading the texture array pointer table.

8. The texture device of claim 7, wherein the texture array pointer table is stored in the texture memory.

9. The texture device of claim 6, wherein the texture memory management unit further comprises:

swirl logic translating the least significant bits of the texture tile addresses, to form a swirled address, such that the texel blocks in a square group of the texel blocks are sequentially addressed by the swirled address in a manner where each one of the texel blocks in the square group is spatially adjacent to the sequentially previous one of the texel blocks in the square group, except for the sequentially first of the texel blocks in the square group.

10. The texture device of claim 9, wherein the texture memory management unit further comprises:

a texture array pointer table associating a the combination of the texture identifier and the level of detail with a base address into texture memory; and an adder circuit combining the base address with the swirled address to form a physical address.

11. The texture device of claim 5, further comprising:

a memory queue storing: (1) a texel prefetch buffer read request comprising a line number of one of the texel blocks within the texel prefetch buffer, the read request being stored into the memory queue if the checking by the prefetch buffer tag blocks indicate the texel block is stored in the texel prefetch buffer; and (2) a texel prefetch buffer write request comprising a line number in the texel prefetch buffer into which of one of the texel blocks is to be stored, the write request being stored into the memory queue if the checking by the prefetch buffer tag blocks indicate the texel block is not stored in the texel prefetch buffer.

12. The texture device of claim 5, further comprising:

logic reading a plurality of texels in parallel from the texel prefetch buffer; and texture interpolator logic filtering the read plurality of texels to produce a texture value for the corresponding pixel fragment.

13. The texture device of claim 5, further comprising:

logic for pseudo-randomly selecting a subset of the plurality of banks in the texel prefetch buffer to store even numbered levels of detail for a particular texture map and a different subset of the plurality of banks in the texel prefetch buffer to store the odd numbered levels of detail for the particular texture map, the pseudo-random selection being based on the texture identifier.

14. The texture device of claim 5, further comprising:

a prioritization block prioritizing texture memory read requests from a plurality of sources.

15. The texture device of claim 5, further comprising:

one or more reorder logic blocks, the reorder logic blocks comprising:

(1) a memory control block receiving dispatched addresses and sequentially performing read operations on the texture memory using the dispatched addresses;

(2) a first level reorder queue storing a plurality of current addresses, each of the current addresses being equal to one of the dispatched addresses;

(3) a conflict queue storing stalled addresses, each of the stalled addresses being an address into texture memory that has its corresponding read operation postponed due to an address conflict;

(4) an in-order tag queue storing first tag information, each piece of first tag information corresponding to an address in the first level reorder queue;

(5) an out-of-order tag queue storing second tag information, each piece of second tag information corresponding to an address in the conflict queue;

(6) a conflict detection block comprising:

(6a) logic receiving a new address into texture memory, the new address being part of a sequence of addresses being received in a specific order;

(6b) logic detecting a memory conflict between the new address and any of the plurality of current addresses;

(6c) logic dispatching the new address to the memory control block if the conflict was not detected so as to make the new address into one of the dispatched addresses;

(6d) logic writing the new address into the first level reorder queue if the conflict is not detected so as to make the new address into one of the current addresses;

(6e) logic writing the new address into the conflict queue if the conflict is detected so as to make the new address into one of the stalled addresses;

(6f) logic writing new tag information corresponding to the new address into the in-order tag queue if the conflict is not detected;

(6g) logic writing the new tag information corresponding to the new address into the out-of-order tag queue if the conflict is detected; and (6h) logic determining when the stalled addresses are dispatched to the memory control block; and (7) logic reassembling data read from the texture memory into the specific order, the reassembling being done according to the first tag information and the second tag information.

16. A graphics rendering pipeline generating a rendered image from a plurality of graphics primitives, the pipeline comprising:

a hidden surface removal block determining, for each sample in the rendered image, a set of visible graphics primitives from the plurality of graphics primitives, the determining being done before any pixel coloring is done, wherein one or more of the samples from a single visible graphics primitive and within a pixel are grouped together in a visible fragment; and a texture block generating texture values, the texture block comprising:

a texture memory storing texture maps, each texture map comprising a plurality of levels of detail, each of the level of detail being an array of texels, the texels grouped into texel blocks, each texel block being a two-by-two cluster of texels;

logic receiving texture coordinates corresponding to a visible fragment;

a texel prefetch buffer storing prefetched texel blocks, the prefetched texel blocks being the texel blocks read from the texture memory; and a prefetch tag memory storing tags corresponding to the prefetched texel blocks, the tags used to determine which of the texel blocks are stored in the texel prefetch buffer in order to avoid re-reading a previously read one of the texel blocks from the texture memory, the tags configured to allow the prefetched texel blocks to be independently prefetched from any texture map and any level of detail, the independence being achieved by the tags being comprised of: (1) a texture identifier; (2) a level of detail indicator; (3) a texture U-coordinate of the stored texel block; and (4) a texture V-coordinate of the stored texel block.

17. The graphics rendering pipeline of claim 16, wherein the texture block further comprises:

bank mapping logic translating each of the received texture coordinates to a plurality of texture tile addresses, each of the texture tile addresses comprising: (1) the texture identifier; (2) the level of detail indicator; (3) the texture U coordinate of the stored texel block; and (4) the texture V coordinate of the stored texel block.

18. The graphics rendering pipeline of claim 16, wherein the texture block further comprises:

a plurality of miss queues storing the texture tile addresses that are checked by the prefetch buffer tag blocks and are not present in the prefetch buffer tag blocks;

the prefetch buffer control logic further comprising logic reading the miss queues to determine which tile addresses need to be used to read texel blocks from the texture memory; and a texture memory management unit translating the texture tile addresses into memory addresses.

19. The graphics rendering pipeline of claim 18, wherein the texture block further comprises:

a texture array pointer table associating a plurality of texture array identifiers with a corresponding address in the texture memory, each of the texture array identifiers being the combination of the texture identifier and the level of detail; and the texture memory management unit further comprising logic for reading the texture array pointer table.

20. The graphics rendering pipeline of claim 18, wherein the texture memory management unit further comprises:

swirl logic translating the least significant bits of the texture tile addresses, to form a swirled address, such that the texel blocks in a square group of the texel blocks are sequentially addressed by the swirled address in a manner where each one of the texel blocks in the square group is spatially adjacent to the sequentially previous one of the texel blocks in the square group, except for the sequentially first of the texel blocks in the square group.

21. The graphics rendering pipeline of claim 20, wherein the texture memory management unit further comprises:

a texture array pointer table associating a the combination of the texture identifier and the level of detail with a base address into texture memory; and an adder circuit combining the base address with the swirled address to form a physical address.

22. The graphics rendering pipeline of claim 21, wherein the bits within the physical address that select a memory device from a plurality of devices are derived from the least significant bits of the U coordinate and the V coordinate.

23. The graphics rendering pipeline of claim 22, wherein the texture block further comprises:

logic performing a programmable mapping function of the bits within the physical address to (1) device bits selecting one or more memory devices from a plurality of memory devices; and (2) bank bits selecting a memory bank within the selected memory device.

24. The graphics rendering pipeline of claim 23, wherein the texture block further comprises:

a prioritization block prioritizing texture memory read requests from a plurality of sources.

25. The graphics rendering pipeline of claim 16, wherein the texture block further comprises:

a memory queue storing: (1) a texel prefetch buffer read request comprising a line number of one of the texel blocks within the texel prefetch buffer, the read request being stored into the memory queue if the checking by the prefetch buffer tag blocks indicate the texel block is stored in the texel prefetch buffer; and (2) a texel prefetch buffer write request comprising a line number in the texel prefetch buffer into which of one of the texel blocks is to be stored, the write request being stored into the memory queue if the checking by the prefetch buffer tag blocks indicate the texel block is not stored in the texel prefetch buffer.

26. The graphics rendering pipeline of claim 16, wherein the texture block further comprises:

logic reading a plurality of texels in parallel from the texel prefetch buffer; and texture interpolator logic filtering the read plurality of texels to produce a texture value for the corresponding pixel fragment.

27. The graphics rendering pipeline of claim 16, wherein the number of banks in the texel prefetch buffer is equal the number of texels filtered by the texture interpolator.

28. The graphics rendering pipeline of claim 16, wherein the texture block further comprises:

logic for pseudo-randomly selecting a subset of the plurality of banks in the texel prefetch buffer to store even numbered levels of detail for a particular texture map and a different subset of the plurality of banks in the texel prefetch buffer to store the odd numbered levels of detail for the particular texture map, the pseudo-random selection being based on the texture identifier.

29. A texture method for a graphics rendering pipeline, the pipeline receiving a plurality of graphics primitives and generating a rendered image, at least some of the graphics primitives being rendered with at least one texture map, the method comprising the steps:

storing the texture maps in a texture memory, each of the texture maps being an array of texels, the texels grouped into texel blocks;

receiving texture coordinates corresponding to a pixel fragment;

translating each of the texture coordinates to a plurality of texture tile addresses, each of the texture tile addresses comprising: (1) a texture identifier; (2) a level of detail indicator; (3) a texture U-coordinate of the stored texture element (texel) block; and (4) a texture V-coordinate of the stored texel block;

storing prefetched texel blocks in a texel prefetch buffer, the prefetched texel blocks being the texel blocks read from the texture memory, the texel prefetch buffer organized into a plurality of banks, the number of the banks within the texel prefetch buffer being an integer multiple of the number of texels in the texel block, the texels in any of the prefetched texel blocks being stored in separate ones of said banks, the banks operating in parallel;

storing tags in a plurality of prefetch buffer tag blocks, the tags each corresponding to one stored texel block, the tags indicating whether a texel block is stored in the texel prefetch buffer and indicating the location of the texel block in the texel prefetch buffer, the prefetch buffer tag blocks checking the plurality of texture tile addresses against the stored tags in one clock cycle thereby checking for a match, each tag comprising (1) the texture identifier; (2) the level of detail indicator; (3) the texture U-coordinate of the stored texel block; and (4) the texture V-coordinate of the stored texel block; and reading the stored texel blocks from the texture memory when the checking does not indicate a needed texel block is not in the texel prefetch buffer.

30. The method of claim 29, further comprising the steps:

storing the texture tile addresses that are checked by the prefetch buffer tag blocks and are not present in the prefetch buffer tag blocks into a plurality of miss queues;

reading the miss queues to determine which tile addresses need to be used to read texel blocks from the texture memory; and translating the texture tile addresses into memory addresses.

31. The method of claim 30, further comprising the steps:

associating a plurality of texture array identifiers with a corresponding address in the texture memory, each of the texture array identifiers being the combination of the texture identifier and the level of detail;

reading the texture array pointer table, reading a plurality of texels in parallel from the texel prefetch buffer; and filtering the read plurality of texels to produce a texture value for the corresponding pixel fragment, prioritizing texture memory read requests from a plurality of sources, maintaining a list of current addresses, each of the current addresses being an address into the texture memory that has been dispatched to the texture memory as part of a memory read operation that has not yet completed;

maintaining a list of stalled addresses, each of the stalled addresses being an address into the texture memory that has its corresponding read operation postponed due to an address conflict;

maintaining a list of first tag information, each piece of first tag information corresponding to an address in the list of current addresses;

maintaining a list of second tag information, each piece of second tag information corresponding to an address in the list of stalled addresses;

receiving a new address into texture memory, the new address being part of a sequence of addresses being received in a specific order, detecting the presence of a memory conflict between the new address and any of the current addresses;

if the conflict is not detected, dispatching the new address to perform a read operation from the texture memory;

if the conflict is not detected, adding the new address to the list of current;

if the conflict is detected, adding the new address to the list of stalled addresses;

if the conflict is not detected, adding the new tag information corresponding to the new address to the list of first tag information;

if the conflict is detected, adding the new tag information corresponding to the new address to the list of second tag information;

determining when the stalled addresses are dispatched to the memory control block; and reassembling data read from the texture memory into the specific order, the reassembling being done according to the first tag information and the second tag information.

32. The method of claim 29, further comprising the step:

storing into a memory queue: (1) a texel prefetch buffer read request comprising a line number of one of the texel blocks within the texel prefetch buffer, the read request being stored into the memory queue if the checking by the prefetch buffer tag blocks indicate the texel block is stored in the texel prefetch buffer; and (2) a texel prefetch buffer write request comprising a line number in the texel prefetch buffer into which of one of the texel blocks is to be stored, the write request being stored into the memory queue if the checking by the prefetch buffer tag blocks indicate the texel block is not stored in the texel prefetch buffer.

33. In a graphics pipeline processor, a method for generating texture values associated with pixels or pixel fragments, said method comprising:

storing a plurality of texture maps in a texture memory, each of said plurality of texture maps including an array of texels grouped into texel blocks;

reading a texel block from said texture memory;

storing said read texel block in a texel prefetch buffer;

storing tags corresponding to the texel blocks in a prefetch tag memory;

said tags indicating whether a texel block is stored in the texel prefetch buffer and indicating the location of the texel block in the texel prefetch buffer, the prefetch buffer tag blocks checking a plurality of texture addresses against the stored tags thereby checking for a match, each tag comprising: (1) the texture identifier; (2) the level of detail indicator; (3) the texture U-coordinate of the stored texel block; and (4) the texture V-coordinate of the stored texel block;

querying said tags prior to reading said texture memory to determine which of the texel blocks requested to be read are already stored in the texel prefetch buffer;

retrieving said texel blocks preferentially from said texel prefetch buffer when so stored and from said texture memory when not so stored in order to avoid re-reading a previously read one of the texel blocks from said texture memory; and processing said retrieved texel blocks to generate said texture value.

34. The method in claim 33, wherein said texture maps are stored in said texture memory at different levels of detail representing the appearance of the texture at a given distance from an eye point.

35. The method in claim 33, wherein said plurality of texture maps comprise a plurality of MIP-mapped texture maps; and said processing includes interpolating said plurality of MIP-mapped texture maps to produce a texture value for a given pixel fragment that approximates the correct level of texture detail for the appearance of the texture at the distance or the pixel fragment from the eye point.

36. The method in claim 33, wherein said tags are configured to allow the prefetched texel blocks to be independently prefetched from any texture map and any level of detail.

37. In a graphics pipeline processor, a method for generating texture values associated with pixels or pixel fragments, said method comprising:

storing a plurality of texture maps in a texture memory, each of said plurality of texture maps including an array of texels grouped into texel blocks;

reading a texel block from said texture memory;

storing said read texel block in a texel prefetch buffer;

storing tags corresponding to the texel blocks in a prefetch tag memory;

querying said tags prior to reading said texture memory to determine which of the texel blocks requested to be read are already stored in the texel prefetch buffer;

retrieving said texel blocks preferentially from said texel prefetch buffer when so stored and from said texture memory when not so stored in order to avoid re-reading a previously read one of the texel blocks from said texture memory; and processing said retrieved texel blocks to generate said texture value, wherein said tags are configured to allow the prefetched texel blocks to be independently prefetched from any texture map and any level of detail, said texel block prefetch independence being achieved by providing tags having: (1) a texture identifier, (2) a level of detail indicator, (3) a texture U-coordinate of the stored texel block, and (4) a texture V-coordinate of the stored texel block.

38. In a graphics pipeline processor, a method for generating texture values associated with pixels or pixel fragments, said method comprising:

storing a plurality of MIP-mapped texture maps in a texture memory, each of said plurality of texture maps including an array of texels grouped into texel blocks;

reading a texel block from said texture memory;

storing said read texel block in a texel prefetch buffer;

storing tags corresponding to the texel blocks in a prefetch tag memory;

querying said tags prior to reading said texture memory to determine which of the texel blocks requested to be read are already stored in the texel prefetch buffer;

retrieving said texel blocks preferentially from said texel prefetch buffer when so stored and from said texture memory when not so stored in order to avoid re-reading a previously read one of the texel blocks from said texture memory; and processing said retrieved texel blocks to generate said texture value, said processing including interpolating said plurality of MIP-mapped texture maps to produce a texture value for a given pixel fragment that approximates the correct level of texture detail for the appearance of the texture at the distance or the pixel fragment from the eye point;

said tags being configured to allow the prefetched texel blocks to be independently prefetched from any texture map and any level of detail; and said texel block prefetch independence being achieved by providing tags having: (1) a texture identifier; (2) a level of detail indicator; and (3) texture coordinates of the stored texel block.

39. The method in claim 38, wherein said texture coordinates comprise a texture U-coordinate of the stored texel block, and a texture V-coordinate of the stored texel block.

* * * * *